(12) United States Patent
Xu et al.

(10) Patent No.: US 10,869,329 B2
(45) Date of Patent: Dec. 15, 2020

(54) RESOURCE REQUEST METHOD AND SYSTEM, AND DEVICE

(71) Applicant: Huawei Technologies Co., Ltd., Shenzhen (CN)

(72) Inventors: Haibo Xu, Beijing (CN); Yiru Kuang, Beijing (CN); Jian Wang, Beijing (CN); Da Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/338,112

(22) PCT Filed: Sep. 30, 2016

(86) PCT No.: PCT/CN2016/101407
§ 371 (c)(1),
(2) Date: Mar. 29, 2019

(87) PCT Pub. No.: WO2018/058684
PCT Pub. Date: Apr. 5, 2018

(65) Prior Publication Data
US 2020/0029353 A1 Jan. 23, 2020

(51) Int. Cl.
*H04W 72/12* (2009.01)
*H04W 52/02* (2009.01)
*H04W 88/04* (2009.01)

(52) U.S. Cl.
CPC ... *H04W 72/1284* (2013.01); *H04W 52/0209* (2013.01); *H04W 88/04* (2013.01)

(58) Field of Classification Search
CPC . H04W 72/12; H04W 52/02; H04W 72/1284; H04W 88/04; H04W 52/0209
See application file for complete search history.

(56) References Cited

U.S. PATENT DOCUMENTS

| | | | | |
|---|---|---|---|---|
| 2012/0268553 | A1* | 10/2012 | Talukder | H04L 65/1093 348/14.08 |
| 2015/0117241 | A1* | 4/2015 | Koc | H04W 28/08 370/252 |
| 2015/0358838 | A1* | 12/2015 | Wei | H04W 76/15 370/228 |

(Continued)

FOREIGN PATENT DOCUMENTS

| CN | 101873642 A | 10/2010 |
|---|---|---|
| CN | 104349461 A | 2/2015 |

(Continued)

OTHER PUBLICATIONS

Coolpad, "Discussion on Resource Allocation for ProSe UE-to-Network Relay", 3GPP TSG-RAN WG2 #91, R2-153252, XP050992999, Beijing, China, Aug. 24-28, 2015, 4 pages.

(Continued)

*Primary Examiner* — Chi Ho A Lee
(74) *Attorney, Agent, or Firm* — Slater Matsil, LLP

(57) ABSTRACT

A resource request method and system, and a device are provided, and relate to the field of communications technologies. The method may include: triggering, by remote UE, a buffer status report BSR, and sending the BSR to relay UE, where the BSR is used to provide a base station with a size of available to-be-transmitted data in a buffer of the remote UE.

11 Claims, 20 Drawing Sheets

(56) References Cited

U.S. PATENT DOCUMENTS

| | | | | |
|---|---|---|---|---|
| 2016/0338095 | A1* | 11/2016 | Faurie | H04W 72/14 |
| 2017/0006649 | A1 | 1/2017 | Zhao et al. | |
| 2017/0093541 | A1* | 3/2017 | Pan | H04L 5/0048 |
| 2017/0094656 | A1* | 3/2017 | Chen | H04W 72/0446 |
| 2017/0230959 | A1 | 8/2017 | Wu et al. | |
| 2017/0353819 | A1* | 12/2017 | Yin | H04W 4/70 |
| 2018/0054237 | A1* | 2/2018 | Tseng | H04W 72/085 |
| 2018/0054804 | A1* | 2/2018 | Luo | H04W 72/04 |
| 2018/0069618 | A1* | 3/2018 | Loehr | H04W 88/04 |
| 2019/0028177 | A1* | 1/2019 | Feng | H04W 76/27 |
| 2019/0053215 | A1* | 2/2019 | Yu | H04B 7/15542 |

FOREIGN PATENT DOCUMENTS

| | | |
|---|---|---|
| CN | 104768206 A | 7/2015 |
| CN | 104869526 A | 8/2015 |
| CN | 104954976 A | 9/2015 |
| CN | 105451211 A | 3/2016 |
| CN | 106160951 A | 11/2016 |
| CN | 107466068 A | 12/2017 |
| EP | 3091803 A1 | 11/2016 |

OTHER PUBLICATIONS

ITL, "Considerations on SL BSR for relay UE", 3GPP TSG RAN WG2 Meeting #92, R2-156316, XP051005793, Anaheim, USA, Nov. 16-20, 2015, 6 pages.

3GPP TS 36.321 V13.2.0 (Jun. 2016), 3rd Generation Partnership Project; Technical Specification Group Radio Access Network; Evolved Universal Terrestrial Radio Access (E-UTRA); Medium Access Control (MAC) protocol specification (Release 13), Jun. 2016, 91 pages.

3GPP TS 36.321 V13.1.0 (Mar. 2016), 3rd Generation Partnership Project; Technical Specification Group Radio Access Network; Evolved Universal Terrestrial Radio Access (E-UTRA); Medium Access Control (MAC) protocol specification (Release 13), 85 pages.

* cited by examiner

| Destination index$_1$ | | | | LCG ID$_1$ | | Buffer Size$_1$ | | Oct 1 |
|---|---|---|---|---|---|---|---|---|
| Buffer Size$_1$ | | | | Destination index$_2$ | | | | Oct 2 |
| LCG ID$_2$ | | Buffer Size$_2$ | | | | | | Oct 3 |
| ... | | | | | | | | |
| Destination index$_{N-1}$ | | | | LCG ID$_{N-1}$ | | Buffer Size$_{N-1}$ | | Oct 1.5×N−2 |
| Buffer Size$_{N-1}$ | | | | Destination index$_N$ | | | | Oct 1.5×N−1 |
| LCG ID$_N$ | | Buffer Size$_N$ | | | | | | Oct 1.5×N |

FIG. 4c

| Destination index$_1$ | | | | LCG ID$_1$ | | Buffer Size$_1$ | | Oct 1 |
|---|---|---|---|---|---|---|---|---|
| Buffer Size$_1$ | | | | Destination index$_2$ | | | | Oct 2 |
| LCG ID$_2$ | | Buffer Size$_2$ | | | | | | Oct 3 |
| ... | | | | | | | | |
| Destination index$_{N-1}$ | | | | LCG ID$_{N-1}$ | | Buffer Size$_{N-1}$ | | Oct 1.5×N−2 |
| Buffer Size$_{N-1}$ | | | | R | R | R | R | Oct 1.5×N−1 |

FIG. 4d

RESOURCE REQUEST METHOD AND SYSTEM, AND DEVICE

CROSS-REFERENCE TO RELATED APPLICATIONS

This application is a national stage of International Application No. PCT/CN2016/101407, filed on Sep. 30, 2016, which is hereby incorporated by reference in its entirety.

TECHNICAL FIELD

The present invention relates to the field of communications technologies, and in particular, to a resource request method and system, and a device.

BACKGROUND

Currently, in a relatively special device-to-device (D2D) communication mode, user equipment (UE) is connected to a network by using another UE that has a relay function. Usually, the former is referred to as remote user equipment (Remote UE), and the latter is referred to as relay user equipment (Relay UE).

Such D2D communication between the remote UE and the relay UE may be performed in a communication mode that is based on a wireless local area network (WLAN) technology and a Bluetooth technology, or may be performed in a communication mode that is based on a Long Term Evolution sidelink (LTE Sidelink) technology. In the communication mode that is based on the LTE sidelink technology, resources are assigned on a sidelink in two manners: Manner 1: Resources are assigned based on base station scheduling. To be specific, when user equipment that performs D2D communication needs to transmit data on a sidelink, the user equipment needs to first send resource request information to a base station, and then the base station may assign a dedicated resource to the user equipment to transmit the data on the sidelink. Manner 2: User equipment selects a resource independently. To be specific, when the user equipment that performs D2D communication needs to transmit data on a sidelink, the user equipment may randomly select a resource from a resource pool configured by a base station, to transmit the data on the sidelink. The resource pool configured by the base station may be configured by using system information, or may be configured by using dedicated signaling after a request that the user equipment needs to perform sidelink communication is received.

In a scenario in which user equipment is connected to a network by using another UE that has a relay function, when the remote UE and the relay UE perform D2D communication with the relay UE through resource assignment that is based on base station scheduling, the remote UE needs to maintain uplink synchronization with the base station, to send resource request information to the base station. To be specific, the remote UE needs to send an uplink signal to the base station; or the remote UE does not need to maintain uplink synchronization with the base station. However, when the remote UE needs to send resource request information, the remote UE requests, by using a random access procedure, to obtain uplink synchronization, and requests an uplink grant at the same time. In either manner, relatively much power of the remote UE is consumed.

SUMMARY

This application provides a resource request method and system, and a device, to resolve a problem that UE consumes relatively much power because the UE sends resource request information to a base station when resource assignment that is based on base station scheduling is used.

To achieve the foregoing objective, the following technical solutions are used in this application.

According to a first aspect, a resource request method is provided. The method may include: triggering, by remote UE, a BSR used to provide a base station with a size of available to-be-transmitted data in a buffer of the remote UE, and sending the BSR to relay user equipment relay UE.

In this way, the remote UE may report resource request information to the base station by using the relay UE, to avoid a problem that power consumption is increased because the remote UE directly reports the resource request information of the remote UE to the base station. For a method in which the remote UE reports other resource request information to the base station by using the relay UE, refer to the resource request method provided in this embodiment of the present invention.

In an implementation of the first aspect, with reference to the first aspect, the remote UE may send any BSR to the relay UE in any one of the following manner 1 to manner 3.

Manner 1: The remote UE obtains a control signaling resource pool and a data resource pool that are configured by the base station for the remote UE, where the control signaling resource pool and the data resource are used by the remote UE to transmit resource request information; selects a first resource from the control signaling resource pool; and sends sidelink control information SCI to the relay UE by using the first resource. The remote UE selects a second resource from the data resource pool, and sends, to the relay UE by using the second resource, a Media Access Control protocol data unit MAC PDU that includes the BSR.

The SCI includes indication information used to indicate location information of the second resource. The MAC PDU includes a Media Access Control header MAC header and a first Media Access Control control element MAC CE. The MAC header includes a first Media Access Control subheader MAC subheader, and the first MAC CE includes the BSR. The first MAC subheader includes a logical channel ID LCID, and the LCID is used to indicate that the first MAC CE is a BSR MAC CE and indicate a format of the BSR MAC CE.

Manner 2: The remote UE obtains a control signaling resource pool configured by the base station for the remote UE, where the control signaling resource pool is used by the remote UE to transmit resource request information; selects a third resource from the control signaling resource pool; and sends, to the relay UE by using the third resource, SCI that includes the BSR. The SCI may include one or more types of information: an index of the remote UE, a destination layer 2 ID, a size of to-be-transmitted data in a buffer corresponding to each logical channel group of the remote UE, and a format of the BSR.

The index of the remote UE is a unique identifier of the remote UE connected to the relay UE, the destination layer 2 ID is a destination layer 2 address of the relay UE, and the format of the BSR is used to indicate that the BSR is a long buffer status report long BSR, a short buffer status report short BSR, or a truncated buffer status report truncated BSR.

Manner 3: The remote UE receives a sidelink grant SL grant assigned by the base station, and sends, to the relay UE by using a resource indicated by the SL grant, a MAC PDU that includes the BSR.

In the manner 3, the MAC PDU may include a MAC header, a second MAC CE, and a first Media Access Control service data unit. The MAC header includes a first MAC subheader, and the second MAC CE is a MAC CE that includes the BSR. The second MAC header includes an LCID, and the LCID included in the second MAC header is used to indicate that the second MAC CE is a BSR MAC CE and indicate a format of the BSR MAC CE.

In the foregoing three manners, the BSR MAC CE is an uplink BSR MAC CE or a sidelink BSR MAC CE. If the BSR MAC CE is the uplink BSR MAC CE, the format of the BSR MAC CE includes three formats: a long BSR MAC CE, a short BSR MAC CE, and a truncated BSR MAC CE. If the BSR MAC CE is the sidelink BSR MAC CE, the format of the BSR MAC CE includes two formats: a sidelink buffer status report sidelink BSR MAC CE and a truncated sidelink buffer status report truncated sidelink BSR MAC CE.

In this way, the remote UE may send the BSR to the relay UE in the foregoing manners.

In another implementation of the first aspect, with reference to the first aspect or the implementation of the first aspect, that the remote UE receives an SL grant assigned by the base station may include: the remote UE triggers a scheduling request SR, and sends the SR to the relay UE, where the scheduling request is used to request the base station to assign the SL grant.

Optionally, that the remote UE sends the SR to the relay UE may include: the remote UE obtains a control signaling resource pool that is configured by the base station for the remote UE and that is used by the remote UE to transmit the scheduling request, selects a fourth resource from the control signaling resource pool, and sends, to the relay UE by using the fourth resource, SCI that includes the SR.

The SCI that includes the SR may include one or more types of information: an index of the remote UE and a destination layer 2 ID. The index of the remote UE is a unique identifier of the remote UE connected to the relay UE, and the destination layer 2 ID is a destination layer 2 address of the relay UE.

According to a second aspect, a resource request method is provided, and the method may include: receiving, by relay UE, at least one BSR that is reported by at least one remote user equipment remote UE and that is used to provide a base station with a size of available to-be-transmitted data in a buffer of the remote UE; and processing the at least one BSR to generate at least one relay BSR, and sending the at least one relay BSR to the base station.

In this way, the relay UE may report, to the base station, received resource request information reported by the remote UE, to avoid a problem that power consumption is increased because the remote UE directly reports the resource request information of the remote UE to the base station. For a method in which the remote UE reports other resource request information to the base station by using the relay UE, refer to the resource request method provided in this embodiment of the present invention.

In an implementation of the second aspect, with reference to the second aspect, the relay UE may process, in the following manner (1) or manner (2), the at least one BSR to generate a relay BSR, and send the relay BSR to the base station.

Manner (1): The relay UE performs combination processing on the at least one BSR to generate one relay buffer status report relay BSR; obtains an uplink scheduling grant UL grant assigned by the base station; and sends, to the base station by using a resource indicated by the UL grant, a Media Access Control protocol data unit MAC PDU that carries the relay BSR.

The MAC PDU may include a Media Access Control header MAC header and a first Media Access Control control element MAC CE, the MAC header includes a first MAC subheader, and the first MAC CE includes the relay BSR.

The first MAC subheader includes an LCID, and the LCID is used to indicate that the first MAC CE is a relay BSR MAC CE. The relay BSR MAC CE includes at least one group of BSR information that is in a one-to-one correspondence with the at least one remote UE. Each group of BSR information includes one or more types of information: an index of remote UE corresponding to the group of BSR information, a format of a BSR reported by the remote UE, a logical channel group quantity included in the BSR reported by the remote UE, a logical channel group identification included in the BSR reported by the remote UE, and a size of available to-be-transmitted data on each logical channel in the BSR reported by the remote UE.

That the relay UE obtains a UL grant assigned by the base station may include: if the relay UE has no available UL grant, the relay UE triggers a scheduling request SR, and sends the SR to the base station, where the SR is used to request the base station to assign the UL grant.

Manner (2): The relay UE separately processes the at least one BSR to generate at least one relay BSR, where the at least one relay BSR is in a one-to-one correspondence with the remote UE. The relay UE obtains a UL grant assigned by the base station; and sends, to the base station by using a resource indicated by the UL grant, a MAC PDU that carries the at least one relay BSR.

In the manner (2), the MAC PDU that carries the relay BSR may use the following design solutions (2.1) to (2.5).

Solution (2.1): The MAC PDU includes a MAC header and at least one second MAC CE, the IIAC header includes at least one second VIAC subheader, the at least one second VIAC subheader is in a one-to-one correspondence with the at least one second VIAC CE, the at least one second MAC CE each is a relay BSR MAC CE, and the at least one second MAC CE is in a one-to-one correspondence with the relay BSR of the at least one remote UE.

Each second MAC subheader includes an LCID, and the LCID included in each second MAC subheader is used to indicate that a second MAC CE corresponding to the second MAC subheader is a relay BSR MAC CE and indicate a format of the relay BSR MAC CE.

Each second MAC CE includes one or more types of information: an index of remote UE corresponding to the second MAC CE, a logical channel group identification included in a BSR reported by the remote UE, and a size of available to-be-transmitted data on each logical channel in the BSR reported by the remote UE.

Solution (2.2): The MAC PDU includes a MAC header and at least one third MAC CE, the at least one third MAC CE is in a one-to-one correspondence with the at least one remote UE, and each third MAC CE includes a relay BSR of remote UE corresponding to the third MAC CE.

The MAC header includes at least one MAC subheader, the at least one MAC subheader includes a third MAC subheader and a fourth MAC subheader, the third MAC subheader and the fourth MAC subheader correspond to first remote UE, and the first remote UE is any one of the at least one remote UE.

The third MAC subheader includes an index of the first remote UE.

The fourth MAC subheader includes an LCID, and the LCID included in the fourth MAC subheader is used to indicate that a third MAC CE corresponding to the first remote UE is a relay BSR MAC CE and indicate a format of the relay BSR MAC CE.

Solution (2.3): The MAC PDU includes a MAC header and at least one MAC CE, and the IIAC header includes at least one IIAC subheader.

The at least one MAC subheader includes a fifth MAC subheader and a sixth MAC subheader, the at least one MAC CE includes a fourth MAC CE and a fifth MAC CE, the third MAC subheader and the fourth MAC subheader correspond to second remote UE, the fourth MAC CE and the fifth MAC CE correspond to the second remote UE, and the second remote UE is any one of the at least one remote UE.

The fifth MAC subheader includes an LCID, and the LCID included in the fifth MAC subheader is used to indicate that the fourth MAC CE includes an index of the second remote UE.

The sixth MAC subheader includes an LCID, and the LCID included in the sixth MAC subheader is used to indicate that the fifth MAC CE is a relay BSR MAC CE and indicate a format of the relay BSR MAC CE.

The fourth MAC CE includes the index of the second remote UE.

The fifth MAC CE includes a relay BSR of the second remote UE.

Solution (2.4): The MAC PDU includes a MAC header and at least one sixth MAC CE, the at least one sixth MAC CE is in a one-to-one correspondence with the at least one remote UE, and each sixth MAC CE includes a relay BSR of remote UE corresponding to the sixth MAC CE.

The MAC header includes a seventh MAC subheader and at least one eighth MAC subheader, and the at least one eighth MAC subheader is in a one-to-one correspondence with the at least one sixth IIAC CE.

The seventh IIAC subheader includes a bitmap, the bitmap includes at least one bit, the at least one bit is in a one-to-one correspondence with the at least one remote UE, and each bit is used to indicate whether the MAC PDU includes a BSR MAC CE reported by remote UE corresponding to the bit.

Each eighth MAC subheader includes an LCID, and the LCID included in each eighth MAC subheader is used to indicate that a sixth MAC CE corresponding to the eighth MAC subheader is a relay BSR MAC CE and indicate a format of the relay BSR MAC CE.

Solution (2.5): The MAC PDU includes a MAC header, a seventh MAC CE, and at least one eighth MAC CE, and the MAC header includes a ninth MAC subheader and at least one tenth MAC subheader.

The at least one tenth MAC subheader is in a one-to-one correspondence with the at least one eighth MAC CE, the at least one eighth MAC CE is in a one-to-one correspondence with the at least one remote UE, and each eighth MAC CE includes a relay BSR of remote UE corresponding to the eighth MAC CE.

The ninth MAC subheader includes an LCID, and the LCID included in the ninth MAC subheader is used to indicate that the seventh MAC CE includes a bitmap.

Each tenth MAC subheader includes an LCID, and the LCID included in each tenth MAC subheader is used to indicate that an eighth MAC CE corresponding to the tenth MAC subheader is a relay BSR MAC CE and indicate a format of the relay BSR MAC CE.

The seventh MAC subheader includes the bitmap, the bitmap includes at least one bit, the at least one bit is in a one-to-one correspondence with the at least one remote UE, and each bit is used to indicate whether the MAC PDU includes a BSR MAC CE reported by remote UE corresponding to the bit.

It should be noted that, in Solutions (2.2) to (2.5), the relay BSR MAC CE may include one or more types of information: a logical channel group identification included in a BSR reported by remote UE corresponding to the relay BSR MAC CE, and a size of available to-be-transmitted data on each logical channel in the BSR reported by the remote UE.

The format of the relay BSR MAC CE includes three formats: a long BSR MAC CE, a short BSR MAC CE, and a truncated BSR MAC CE.

In this way, the relay UE may send, to the base station in the foregoing manner, the received BSR sent by the remote UE.

In another implementation of the second aspect, with reference to the second aspect or the implementation of the second aspect, after obtaining the UL grant assigned by the base station, the relay UE processes a UL BSR MAC CE, an SL BSR MAC CE, and the relay BSR MAC CE in any one of the following priority orders when performing logical channel processing:

UL BSR MAC CE>SL BSR MAC CE=Relay BSR MAC CE;

UL BSR MAC CE=Relay BSR MAC CE>SL BSR MAC CE;

UL BSR MAC CE>SL BSR MAC CE>Relay BSR MAC CE; and

UL BSR MAC CE>Relay BSR MAC CE>SL BSR MAC CE.

In still another implementation of the second aspect, with reference to the second aspect or the implementations of the second aspect, before the receiving, by relay UE, at least one BSR sent by at least one remote UE, the method may further include: receiving, by the relay UE, at least one SR that is sent by the at least one remote UE and that is used to request the base station to assign an SL grant, and sending the at least one SR to the base station.

The relay UE may send the at least one SR to the base station in the following manners (a) to (c).

Manner (a): The relay UE obtains at least one physical uplink control channel resource assigned by the base station, where the at least one physical uplink control channel resource is in a one-to-one correspondence with the at least one remote UE, and each uplink control channel resource is used to transmit, on an uplink, an SR of remote UE corresponding to the uplink control channel resource; and sends the at least one SR to the base station on the at least one physical uplink control channel resource assigned by the base station.

Manner (b): The relay UE performs combination processing on the at least one SR to generate one relay scheduling request relay SR, obtains a UL grant assigned by the base station, and sends, to the base station based on a resource indicated by the UL grant, a MAC PDU that carries the relay SR.

The MAC PDU may include a MAC header and a MAC CE. The MAC header includes a MAC subheader, and the MAC CE includes a relay SR. The MAC subheader includes an LCID, and the LCID included in the MAC subheader is used to indicate the MAC CE is a relay SR MAC CE. The relay SR MAC CE includes at least one bit bit. The at least one bit is in a one-to-one correspondence with the remote UE. A value of a bit is used to represent whether remote UE corresponding to the bit reports an SR.

Manner (c): The relay UE separately processes the at least one SR to generate at least one relay scheduling request relay SR, where the at least one relay SR is in a one-to-one correspondence with the at least one remote UE; obtains a UL grant assigned by the base station; and sends, to the base station based on a resource indicated by the UL grant, a MAC PDU that carries the at least one relay SR.

The MAC PDU may include a MAC header. The MAC header includes at least one MAC subheader, and the at least one MAC subheader is in a one-to-one correspondence with the at least one remote UE. Each MAC subheader includes an index of remote UE corresponding to the MAC subheader and indication information used to indicate a type of a next MAC subheader adjacent to the VIAC subheader.

In this way, the relay UE may send the at least one SR to the base station in the foregoing manners.

In yet another implementation of the second aspect, with reference to the second aspect or the implementations of the second aspect, after receiving the UL grant, the relay UE may process a UL BSR MAC CE, an SL BSR MAC CE, and the relay SR MAC CE in any one of the following priority orders when performing logical channel priority processing:

UL BSR MAC CE>SL BSR MAC CE=Relay SR MAC CE;

Relay SR MAC CE>UL BSR MAC CE>SL BSR MAC CE; and

UL BSR MAC CE>Relay SR MAC CE>SL BSR MAC CE.

According to a third aspect, remote UE is provided, and the remote UE includes: a trigger unit, configured to trigger a buffer status report BSR; and a sending unit, configured to send, to relay user equipment relay UE, the BSR triggered by the trigger unit, where the BSR is used to provide a base station with a size of available to-be-transmitted data in a buffer of the remote UE.

For a specific implementation of the third aspect, refer to behavior functions of the remote UE in the resource request method provided in the first aspect or the possible implementations of the first aspect. Details are not described herein again. Therefore, the remote UE provided in the third aspect can achieve same beneficial effects as the first aspect.

According to a fourth aspect, the present invention provides remote UE, and the remote UE may include: a processor, configured to trigger a buffer status report BSR; and a communications interface, configured to send, to relay user equipment relay UE, the BSR triggered by the processor, where the BSR is used to provide a base station with a size of available to-be-transmitted data in a buffer of the remote UE.

For a specific implementation of the fourth aspect, refer to behavior functions of the remote UE in the resource request method provided in the first aspect or the possible implementations of the first aspect. Details are not described herein again. Therefore, the remote UE provided in the fourth aspect can achieve same beneficial effects as the first aspect.

According to a fifth aspect, the present invention provides a non-volatile computer readable storage medium storing one or more programs, where the one or more programs include an instruction, and when the instruction is executed by the remote UE according to any one of the third aspect or the possible implementations of the third aspect or according to any one of the fourth aspect or the possible implementations of the fourth aspect, the remote UE performs the following event: triggering a buffer status report BSR, and sending, to relay user equipment relay UE, the BSR triggered by the processor, where the BSR is used to provide a base station with a size of available to-be-transmitted data in a buffer of the remote UE.

For a specific implementation of the fifth aspect, refer to behavior functions of the remote UE in the resource request method provided in the first aspect or the possible implementations of the first aspect. Details are not described herein again. Therefore, the remote UE provided in the fifth aspect can achieve same beneficial effects as the first aspect.

According to a sixth aspect, relay UE is provided, and the relay UE includes: a receiving unit, configured to receive at least one buffer status report BSR reported by at least one remote user equipment remote UE, where a BSR sent by each remote UE is used to provide a base station with a size of available to-be-transmitted data in a buffer of the remote UE; a generation unit, configured to process the at least one BSR received by the receiving unit, to generate at least one relay BSR; and a sending unit, configured to send the at least one relay BSR to the base station.

For a specific implementation of the sixth aspect, refer to behavior functions of the relay UE in the resource request method provided in the second aspect or the possible implementations of the second aspect. Details are not described herein again. Therefore, the relay UE provided in the sixth aspect can achieve same beneficial effects as the second aspect.

According to a seventh aspect, relay UE is provided, and the relay UE includes: a communications interface, configured to receive at least one buffer status report BSR reported by at least one remote user equipment remote UE, where a BSR sent by each remote UE is used to provide a base station with a size of available to-be-transmitted data in a buffer of the remote UE; and a processor, configured to process the at least one BSR to generate at least one relay BSR.

The communications interface is further configured to send the at least one relay BSR to the base station.

For a specific implementation of the seventh aspect, refer to behavior functions of the relay UE in the resource request method provided in the second aspect or the possible implementations of the second aspect. Details are not described herein again. Therefore, the relay UE provided in the seventh aspect can achieve same beneficial effects as the second aspect.

According to an eighth aspect, the present invention provides a non-volatile computer readable storage medium storing one or more programs, where the one or more programs include an instruction, and when the instruction is executed by the relay UE according to any one of the sixth aspect or the possible implementations of the sixth aspect or according to any one of the seventh aspect or the possible implementations of the seventh aspect, the relay UE performs the following event: receiving at least one buffer status report BSR reported by at least one remote user equipment remote UE, where a BSR sent by each remote UE is used to provide a base station with a size of available to-be-transmitted data in a buffer of the remote UE; and processing the at least one BSR to generate at least one relay BSR, and sending the at least one relay BSR to the base station.

For a specific implementation of the eighth aspect, refer to behavior functions of the relay UE in the resource request method provided in the second aspect or the possible implementations of the second aspect. Details are not described herein again. Therefore, the relay UE provided in the eighth aspect can achieve same beneficial effects as the second aspect.

According to a ninth aspect, the present invention provides a resource request system, and the system includes the remote UE according to any one of the third aspect or the implementations of the third aspect, according to any one of the fourth aspect or the implementations of the fourth aspect, or according to any one of the fifth aspect or the implementations of the fifth aspect, the relay UE according to any one of the sixth aspect or the implementations of the sixth aspect, according to any one of the seventh aspect or the implementations of the seventh aspect, or according to any one of the eighth aspect or the implementations of the eighth aspect, and a base station.

The system according to the ninth aspect is configured to implement the resource request method shown in the first aspect or the second aspect, and therefore can achieve a same beneficial effect as the foregoing resource request system. Details are not described herein again.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may derive other drawings from these accompanying drawings without creative efforts.

FIG. 4c is a schematic diagram of a format of a BSR according to an embodiment of the present invention;

FIG. 4d is a schematic diagram of a format of a BSR according to an embodiment of the present invention;

FIG. 5a-1 and FIG. 5a-2 are a schematic diagram of a format of a MAC PDU according to an embodiment of the present invention;

FIG. 5b-1 and FIG. 5b-2 are a schematic diagram of a format of a MAC PDU according to an embodiment of the present invention;

DETAILED DESCRIPTION OF ILLUSTRATIVE EMBODIMENTS

A principle of the present invention is as follows: When remote UE is connected to a network by using relay UE, and a base station configures, for the remote UE, a resource assignment manner that is based on base station scheduling and that is used to transmit data on a sidelink, the relay UE sends, to the base station, resource request information (for example, a buffer status report (BSR) or a scheduling request (SR)) initiated by the remote UE, to avoid a problem that power consumption of the remote UE is increased because the remote UE directly sends the resource request information to the base station.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In descriptions of the present invention, it should be understood that, a system or an element indicated by terms such as "first", "second", and "another" is a system or an element that is described based on the embodiments and that has a particular function, and is used only for describing the present invention and for description simplicity, but does not indicate or imply that the indicated system or element needs to have the name, and therefore should not be construed as a limitation on the present invention.

Figure 1:
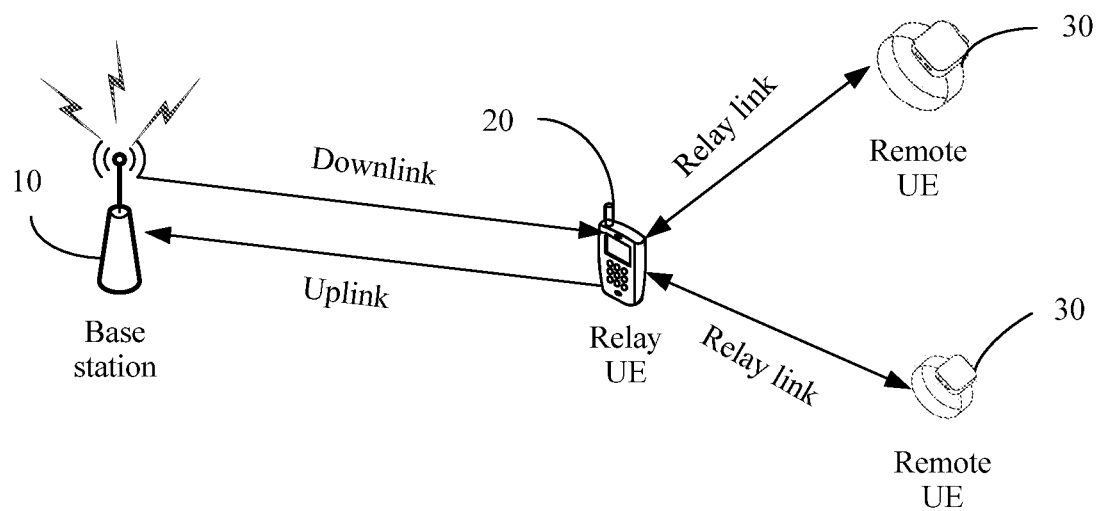
FIG. 1 is a schematic diagram of a network architecture according to an embodiment of the present invention.

FIG. 1 is a schematic diagram of a network architecture according to an embodiment of the present invention. The network is applicable to a resource request method provided in the embodiments. As shown in FIG. 1, the network architecture may include a base station 10, relay UE 20 within a coverage area of the base station 10, and a plurality of remote UEs 30 connected to the relay UE 20. The base station 10 may be an evolved NodeB (eNB, or eNodeB) in LTE. This is not limited in the present invention. The relay UE 20 may be user equipment (UE), may be user equipment (Terminal), a mobile station (MS), or a mobile user equipment (Mobile Terminal), or may be a smart mobile terminal of a wearer of a wearable device, or the like. This is not limited in the present invention. The relay UE 20 may communicate with the base station 10 by using a radio access network (RAN). The remote UE 30 has features of a small volume, a small battery capacity, and low power consumption. For example, the remote UE 30 may be a wearable device, and the wearable device includes but is not limited to various smart wearable devices such as a smartwatch, a smart band, a smart wrist strap, smart glasses, a smart necklace, a smart ring, smart earrings, and a smartphone. In actual application, the remote UE 30 may communicate with the base station 10 by using the relay UE 20.

The remote UE 30 and the relay UE 20 may communicate in a communication mode such as a wireless local area network (WLAN) and a Bluetooth technology, or may communicate based on an LTE sidelink communications technology. This is not limited in this embodiment of the present invention. It should be noted that FIG. 1 is only a schematic diagram, and a quantity of devices shown in FIG. 1 does not constitute a limitation on the technical solutions provided in the present invention. In an actual deployment process, devices may be deployed with a quantity different from the quantity of devices shown in FIG. 1.

Figure 2:
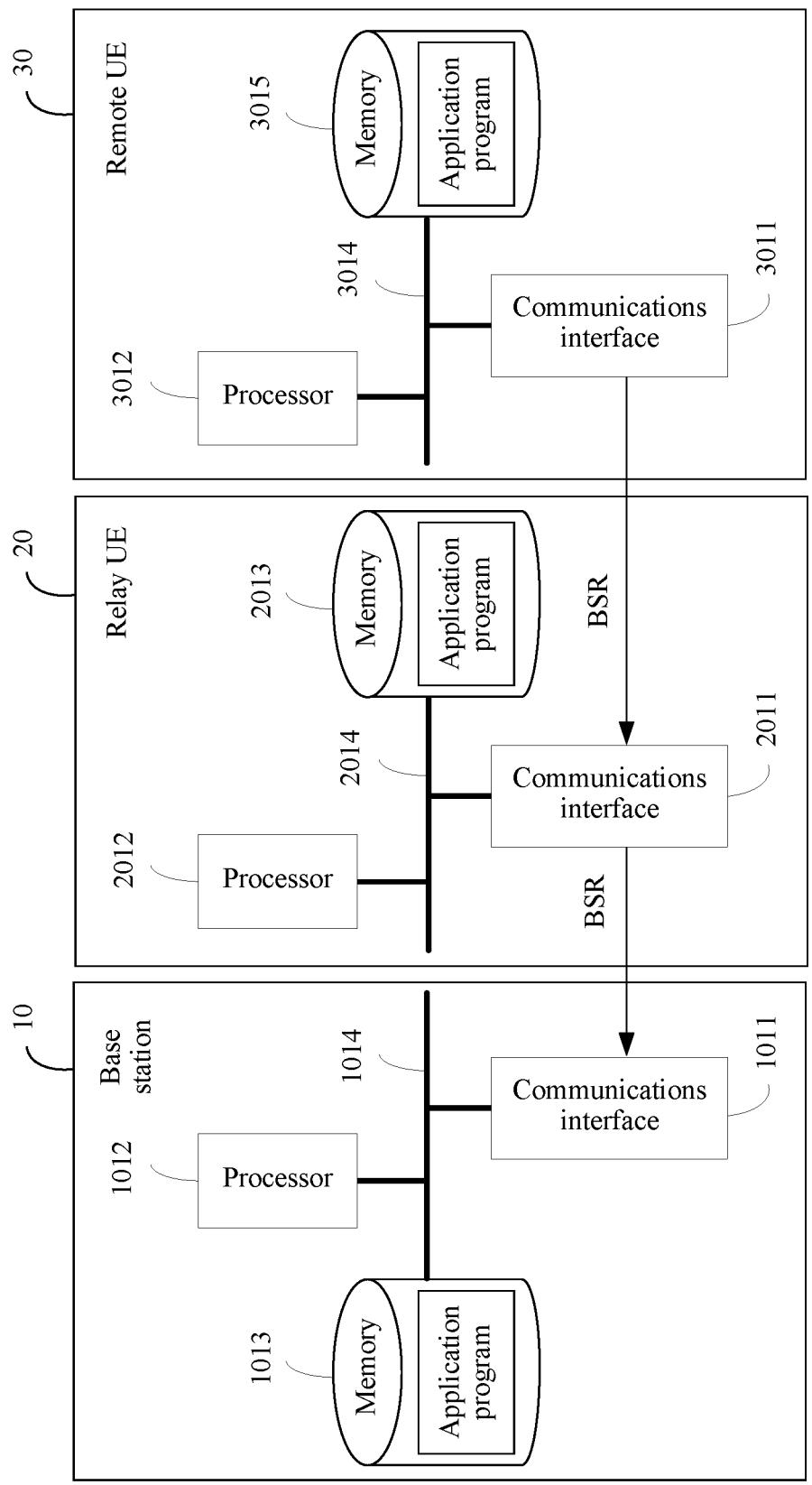
FIG. 2 is a schematic diagram of a system architecture according to an embodiment of the present invention.

Specifically, as shown in FIG. 2, the base station 10 may include a communications interface 1011, a processor 1012, a memory 1013, and at least one communications bus 1014, configured to implement connections and mutual communication between these apparatuses. The relay UE 20 may include a communications interface 2011, a processor 2012, a memory 2013, and at least one communications bus 2014, configured to implement connections and mutual communication between these apparatuses. The remote UE 30 may include a communications interface 3011, a processor 3012, a memory 3013, and at least one communications bus 3014, configured to implement connections and mutual communication between these apparatuses.

The communications interface 1011, the communications interface 2011, and the communications interface 3011 may be implemented by using an antenna, and may be configured to exchange data with an external network element. For example, the communications interface 1011 of the base station 10 may receive and send a data packet or resource request information between the base station 10 and the relay UE 20, and the communications interface 2011 of the relay UE 20 may receive and send a data packet or resource request information between the relay UE 20 and each of UE, the base station 10, or the remote UE 30. For example, the communications interface 3011 may send resource request information (such as a BSR) of the remote UE 30 to the communications interface 2011, and after receiving the resource request information, the communications interface 2011 sends the resource request information to the communications interface 1011 for processing by the base station 10.

The processor 1012, the processor 2012, and the processor 3012 each may be a central processing unit (CPU), each may be an application-specific integrated circuit (ASIC), or each may be one or more integrated circuits configured to implement this embodiment of the present invention, for example, one or more microprocessors (DSP) or one or more field programmable gate arrays (FPGA). The processor 1012, the processor 2012, and the processor 3012 each have a processing and management function. Specifically, the processor 1012 may process received data or information sent by the relay UE 20, the processor 2012 may process received data or information sent by the remote UE 30, and the processor 3012 may process data or information generated by the remote UE 30, or process information or data sent by another device.

The memory 1013, the memory 2013, and the memory 3013 each may be a volatile memory (volatile memory), such as a random access memory (RAM); or each may be a non-volatile memory (non-volatile memory), such as a read-only memory (ROM), a flash memory (flash memory), a hard disk drive (hard disk drive, HDD), or a solid-state drive (SSD); or each may be a combination of the foregoing types of memories. Specifically, the memory 1013, the memory 2013, and the memory 3013 each may store data or program code that supports the resource request method described in the embodiments of the present invention, so that the processor 1012, the processor 2012, and the processor 3012 perform the resource request method provided in the embodiments of the present invention based on the data or the program code stored in the memories in the devices in which the processor 1012, the processor 2012, and the processor 3012 are located.

The communications bus 1014, the communications bus 2014, and the communications bus 3013 each may be classified into an address bus, a data bus, a control bus, and the like, and each may be an industry standard architecture (ISA) bus, a peripheral component interconnect (PCI) bus, an extended industry standard architecture (EISA) bus, or the like. For ease of representation, only one line is used to represent the bus in FIG. 2, but it does not mean that there is only one bus or only one type of bus.

For ease of description, a process of the resource request method provided in the present invention is shown and described in detail in a form of steps in the following embodiments. The shown steps may also be performed in a computer system that can execute a set of instructions. In addition, although a logical sequence is shown in the figure, in some cases, the shown or described steps may be performed in a sequence different from the sequence herein.

Figure 3:
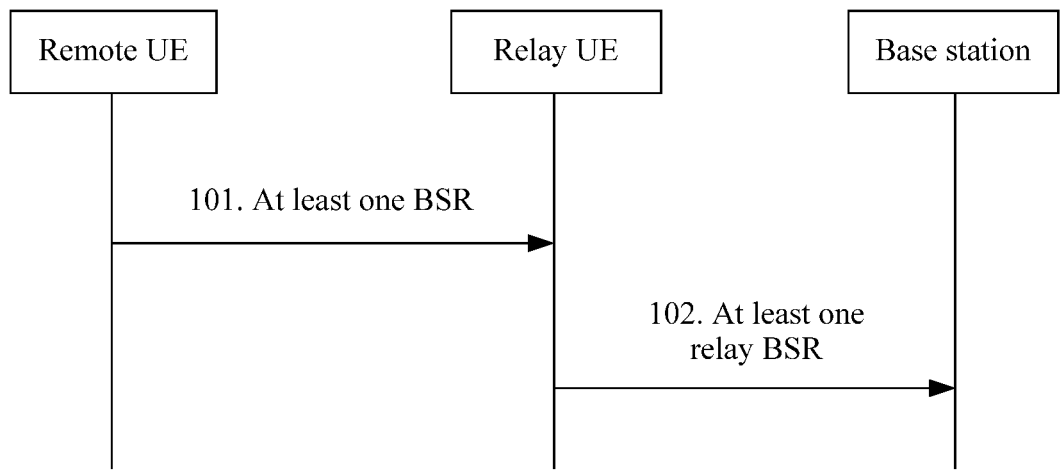
FIG. 3 is a flowchart of a resource request method according to an embodiment of the present invention.

FIG. 3 is a flowchart of a resource request method according to an embodiment of the present invention. The method is interactively performed by the devices shown in FIG. 1 or FIG. 2. The method may be applied to the following scenario: When remote UE needs to transmit data on a sidelink between the remote UE and relay UE, or the remote UE needs to transmit data on an uplink (Uplink) between the remote UE and a base station, the remote UE triggers reporting of a BSR, so that the base station assigns a data transmission resource to the remote UE based on the BSR reported by the remote UE. When the remote UE needs to transmit data on the sidelink between the remote UE and the relay UE, the BSR is used to provide the base station with a size of data that is to be transmitted by using the sidelink and that is in a buffer of the remote UE. When the remote UE needs to transmit data on the uplink between the remote UE and the base station, the BSR is used to provide the base station with a size of data that is to be transmitted by using the uplink and that is in a buffer of the remote UE. It should be noted that, in addition to the BSR, the remote UE may further report other resource request information to the base station by using the relay UE, to avoid a problem that power consumption is increased because the remote UE directly reports the resource request information of the remote UE to the base station. For a method in which the remote UE reports the other resource request information to the base station by using the relay UE, refer to the resource request method provided in this embodiment of the present invention.

As shown in FIG. 3, the method may include the following steps.

101. At least one remote UE sends at least one BSR to relay UE.

The at least one remote UE is connected to the relay UE, and communicates with a base station by using a relay service provided by the relay UE. Each remote UE may send one or more BSRs to the relay UE, each remote UE may be connected to at least one relay UE, and each BSR is used to provide the base station with a size of available to-be-transmitted data in a buffer (Buffer) of remote UE that sends the BSR.

It should be noted that the at least one remote UE may simultaneously send the at least one BSR to the relay UE, or may not need to successively send the at least one BSR to the relay UE. This is not limited in this embodiment of the present invention.

102. The relay UE receives the at least one BSR sent by the at least one remote UE, processes the at least one BSR to generate at least one relay BSR, and sends the at least one relay BSR to a base station.

The at least one relay BSR sent by the relay UE to the base station may be a plurality of BSRs obtained after the relay UE processes the at least one BSR sent by the at least one remote UE, or may be a plurality of BSRs obtained without processing, by the relay UE, the at least one BSR sent by the at least one remote UE. This is not limited in this embodiment of the present invention. In this embodiment of the present invention, only the at least one relay BSR sent by the relay UE to the base station is required to include a meaning that needs to be expressed by the at least one BSR sent by the at least one remote UE.

For example, the relay UE is simultaneously connected to two remote UEs: remote UE 1 and remote UE 2. In addition, the remote UE 1 triggers a BSR 1, and the remote UE 2 triggers a BSR 2. In this case, the remote UE 1 and the remote UE 2 may respectively send the BSR 1 and the BSR 2 to the relay UE. After receiving the BSR 1 and the BSR 2, the relay UE sends the BSR 1 and the BSR 2 to the base station, so that the base station configures proper data transmission resources for the remote UE 1 and the remote UE 2 based on the BSR 1 and the BSR 2.

In this way, the remote UE may report, to the base station by using the relay UE, the BSR triggered by the remote UE, and does not need to directly report the BSR to the base station, to avoid a power consumption increase caused when the remote UE directly reports the BSR to the base station.

Optionally, in step 101, any remote UE may send any BSR to the relay UE in any one of manner 1 to manner 3.

Manner 1: The remote UE obtains a control signaling resource pool and a data resource pool that are configured by the base station for the remote UE, where the control signaling resource pool and the data resource are only used by the remote UE to transmit resource request information, such as a BSR or an SR.

The remote UE selects a first resource from the control signaling resource pool, and sends sidelink control information (SCI) to the relay UE by using the first resource.

The remote UE selects a second resource from the data resource pool, and sends a Media Access Control protocol data unit (English: Medium Access Control Protocol Data Unit, MAC PDU) to the relay UE by using the second resource. The MAC PDU includes the BSR sent by the remote UE, and the SCI includes indication information used to indicate location information of the second resource.

For a manner in which the remote UE obtains the control signaling resource pool and the data resource pool that are configured by the base station for the remote UE, refer to the prior art. Details are not described herein. Optionally, the remote UE may select any resource from the control signaling resource pool as the first resource, and may select any resource from the data resource pool as the second resource.

In this way, the remote UE may send, to the relay UE, the SCI and the MAC PDU including the BSR, so that the relay UE receives, based on the received SCI, the MAC PDU on the resource specified by the SCI, and obtains, from the MAC PDU, the BSR sent by the remote UE.

Figure 3A:
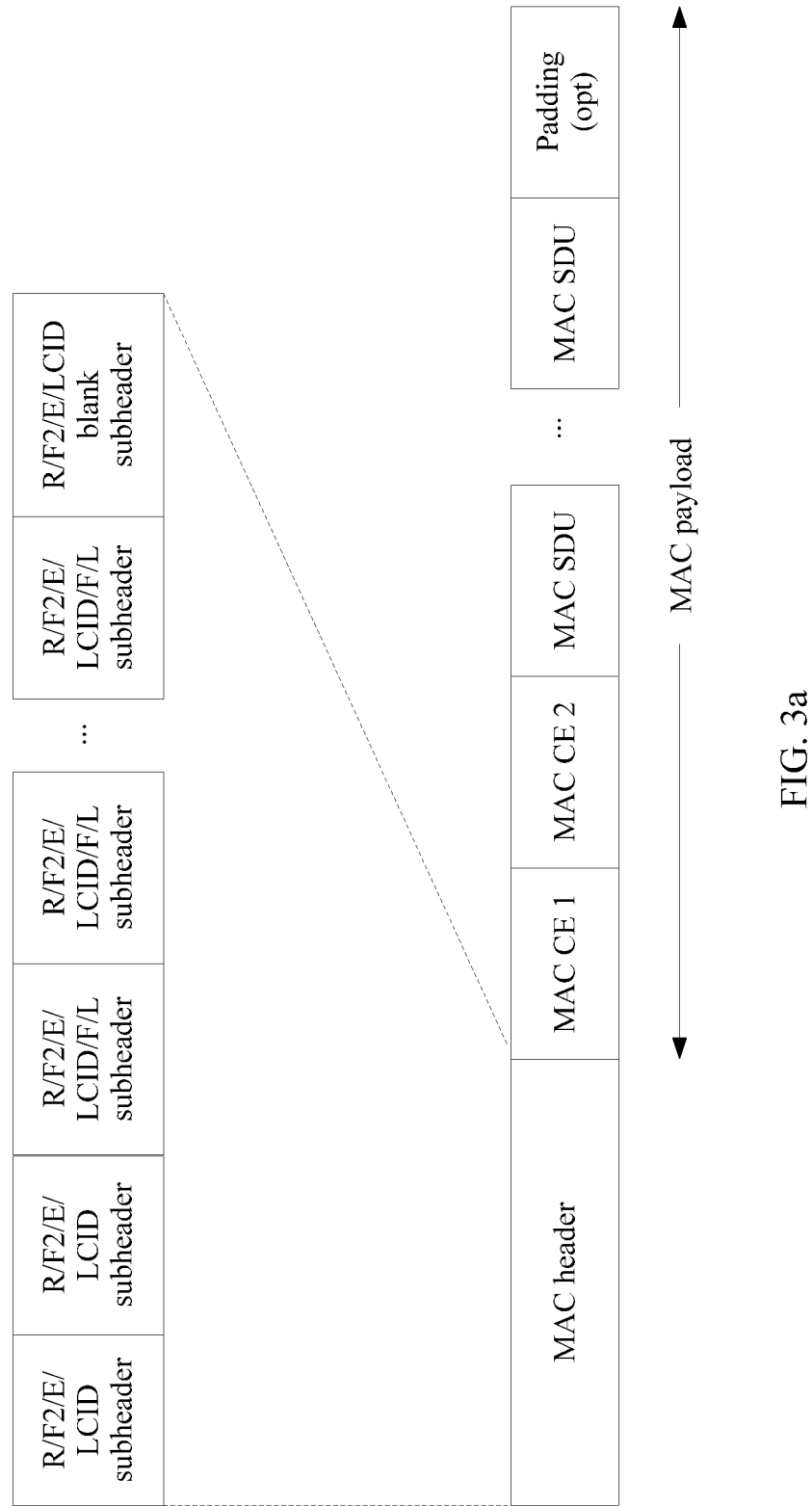
FIG. 3a is a schematic diagram of a format of a MAC PDU according to an embodiment of the present invention.
Figure 3B:
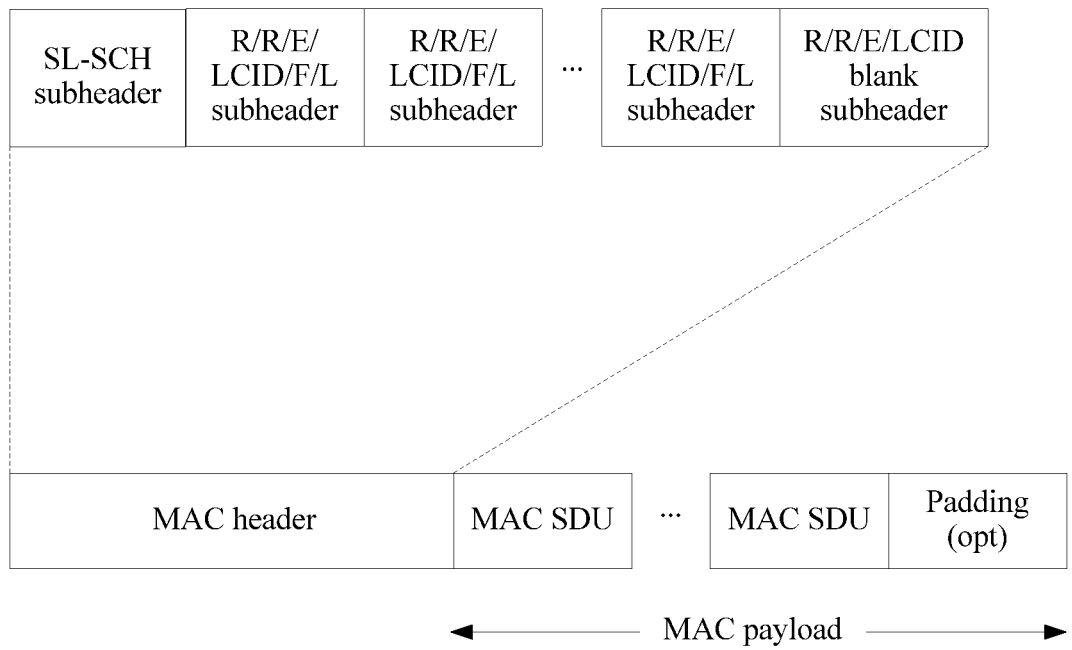
FIG. 3b is a schematic diagram of a format of a MAC PDU according to an embodiment of the present invention.

Currently, in an LTE system, a format of an uplink/downlink MAC PDU is shown in FIG. 3a and a format of a sidelink MAC PDU is shown in FIG. 3b, and may include a Media Access Control header (MAC Header), a plurality of Media Access Control control elements (MAC CE), and a plurality of Media Access Control service data units (MAC SDU). The MAC header may include a plurality of Media Access Control subheaders (MAC Subheader). The MAC subheader included in the MAC PDU may include a sidelink shared channel subheader (SL-SCH Subheader), a plurality of MAC subheaders that are in a one-to-one correspondence with the plurality of VIAC CEs, and a plurality of VIAC subheaders that are in a one-to-one correspondence with the plurality of MAC SDUs. In other words, one MAC subheader corresponds to one MAC CE, and one MAC subheader corresponds to one MAC SDU. Each MAC subheader may include a logical channel ID (LCID). The LCID is used to indicate a type of a MAC CE corresponding to the MAC subheader or a specific logical channel from which a MAC SDU comes. It should be noted that FIG. 3a and FIG. 3b are merely diagrams of examples of the format of the MAC PDU. Quantities of MAC subheaders, MAC CEs, and MAC SDUs shown in FIG. 3a and FIG. 3b are merely examples of representation, and do not constitute a limitation on the solutions described in the present invention. In actual application, the MAC PDU may be constructed based on an actual requirement with quantities different from the quantities of MAC subheaders, MAC CEs, and MAC SDUs shown in FIG. 3a and FIG. 3b.

In the manner 1, the BSR sent by the remote UE may be used as a MAC CE and carried in the MAC PDU shown in FIG. 3b, so that the BSR is sent to the relay UE by using the MAC PDU. In the manner 1, the BSR used as a MAC CE may be referred to as a BSR MAC CE. In addition, it should be noted that the MAC PDU may further include a MAC CE of another type. In other words, the MAC PDU may further include a MAC CE of information of another type. This is not limited in this embodiment of the present invention.

To be convenient for the relay UE to find the BSR MAC CE, optionally, in the manner 1, one MAC subheader corresponding to the BSR MAC CE may be selected from the plurality of MAC subheaders shown in FIG. 3b, so that the MAC subheader includes an LCID that is used to indicate that the MAC CE corresponding to the MAC subheader is the BSR MAC CE and indicate a format of the BSR MAC CE.

Figure 4A:
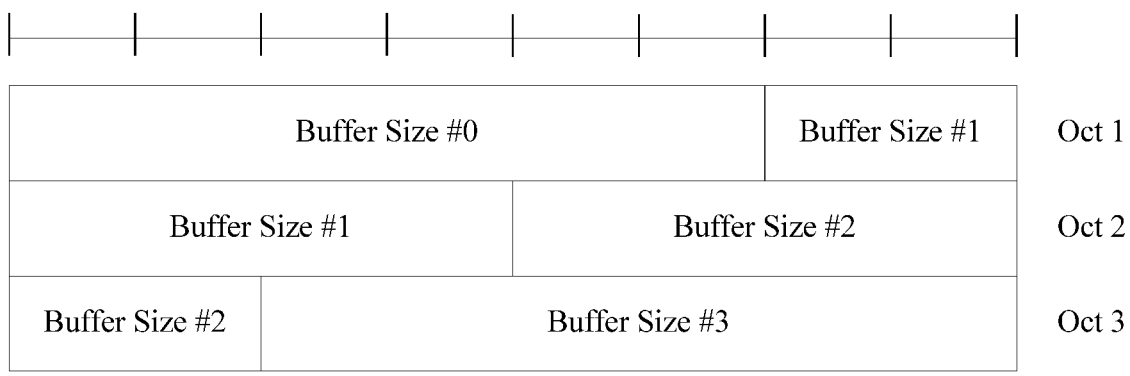
FIG. 4a is a schematic diagram of a format of a BSR according to an embodiment of the present invention.
Figure 4B:
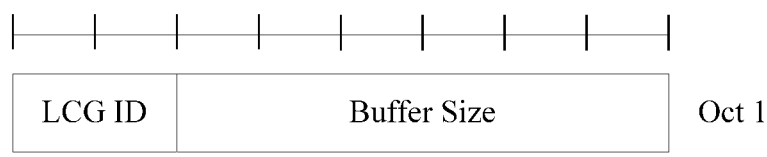
FIG. 4b is a schematic diagram of a format of a BSR according to an embodiment of the present invention.

The format of the BSR MAC CE may be determined based on a type of the BSR. The BSR sent by the remote UE may be an uplink (Uplink) BSR, or may be a sidelink (Sidelink) BSR. When the BSR reported by the MAC CE is the uplink BSR, the BSR MAC CE may be classified into three formats: a long (Long) BSR MAC CE, a short (Short) BSR MAC CE, and a truncated (Truncated) BSR MAC CE. A format of the long BSR MAC CE is shown in FIG. 4a, and may include a data buffer size (Buffer Size) corresponding to each logical channel group, and each buffer size occupies one byte. A format of the short BSR MAC CE and a format of the truncated BSR MAC CE are shown in FIG. 4b, and may include a logical channel group identification and a buffer size corresponding to the logical channel group, and the logical channel group identification and the buffer size each occupy one byte.

In addition, correspondingly, to support the LCID in indicating the format of the BSR MAC CE, when the BSR reported by the MAC CE is the uplink BSR, three new LCID values need to be defined to indicate that a MAC CE corresponding to a MAC subheader in which the LCID value is located is a BSR MAC CE, and indicate a format of the BSR MAC CE.

Optionally, the LCID may be represented by using 5 bits. To be specific, a value range of the LCID value is 0 to 32.

In the manner 1, three reserved values may be selected, as LCID values for indicating the format of the BSR MAC CE, from current reserved values of an LCID used for a sidelink shared channel. For example, as shown in Table 1 below, 11001 may be used to indicate the truncated BSR, 11010 may be used to indicate the short BSR, and 11011 may be used to indicate the long BSR. An indication function of another value of the LCID is still the same as that of the existing value.

TABLE 1

| Index | LCID values |
| --- | --- |
| 00000 | Reserved |
| 00001-01010 | Identity of the logical channel |
| 01011-11000 | Reserved |
| 11001 | Truncated BSR |
| 11010 | Short BSR |
| 11011 | Long BSR |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

When the BSR reported by the MAC CE is the sidelink BSR, the BSR MAC CE may be classified into two formats: a truncated sidelink BSR and a sidelink BSR. Correspondingly, two new LCID values need to be defined to indicate that a MAC CE corresponding to a MAC subheader in which the LCID value is located is a BSR MAC CE, and to indicate a format of the BSR MAC CE. Formats of the truncated sidelink BSR and the sidelink BSR are shown in FIG. 4c and FIG. 4d, and may include a destination index (Destination Index), a logical channel group identification corresponding to the destination, and a buffer size of a logical channel group corresponding to the logical channel group identification. The destination index is used to represent relay UE connected to the remote UE. When there are N relay UEs connected to the remote UE, N groups of a destination index (Destination Index), a logical channel group identification corresponding to the destination, and a buffer size of a logical channel group corresponding to the logical channel group identification are included in the formats shown in FIG. 4c and FIG. 4d. Optionally, when N is an even number, the formats of the truncated sidelink BSR and the sidelink BSR are shown in FIG. 4c. When N is an odd number, the formats of the truncated sidelink BSR and the sidelink BSR are shown in FIG. 4d, and there are a plurality of reserved (R) bits.

Correspondingly, to support the LCID in indicating the format of the BSR MAC CE, when the BSR reported by the MAC CE is the sidelink BSR, optionally, two reserved fields may be selected from current LCID reserved fields as LCID values for indicating the format of the BSR MAC CE. For example, as shown in Table 2 below, 11010 may be used to indicate the truncated sidelink BSR, and 11011 may be used to indicate the sidelink BSR. An indication function of another value of the LCID is still the same as that of the existing value. Details are not described herein again.

TABLE 2

| Index | LCID values |
| --- | --- |
| 00000 | Reserved |
| 00001-01010 | Identity of the logical channel |
| 01011-11001 | Reserved |

TABLE 2-continued

| Index | LCID values |
| --- | --- |
| 11010 | Truncated Sidelink BSR |
| 11011 | Sidelink BSR |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

For example, if the remote UE 1 sends an uplink BSR to the relay UE, and the BSR is a long BSR, the remote UE 1 may use a MAC subheader 1 as an SL-SCH subheader; pad, with the BSR 1 sent by the remote UE 1, the MAC CE as the BSR MAC CE; pad a MAC subheader 2 with an LCID whose value is 11011, to indicate that a format of the MAC CE corresponding to the MAC subheader 2 is a long BSR; and pad a MAC subheader 3 with an LCID whose value is 11111, to indicate that a MAC SDU corresponding to the MAC subheader 3 is blank padding.

Manner 2: The remote UE obtains a control signaling resource pool configured by the base station for the remote UE, where the control signaling resource pool is only used by the remote UE to transmit resource request information such as a BSR or an SR. The remote UE selects a third resource from the control signaling resource pool, and sends, to the relay UE by using the third resource, SCI that includes the BSR. The third resource is any resource in the control signaling resource pool.

In this way, the remote UE may add the BSR to the SCI and send the SCI to the relay UE, so that the relay UE obtains, from the SCI, the BSR sent by the remote UE.

In the manner 2, when the SCI is used to transmit the BSR, the SCI has the following two possible formats (format): (1) and (2).

(1) A new SCI format is redefined. The SCI may include one or more types of the following information: a remote UE index (Index), a destination layer 2 ID (Destination Layer 2 ID), a buffer size, and a BSR type.

The remote UE index is a unique identifier used when the remote UE is connected to the relay UE. A quantity of bits that represent the remote UE index depends on a maximum quantity of remote UEs that can be connected to the relay UE. For example, if the relay UE may be connected to a maximum of four remote UEs, 2 bits may be used to represent the remote UE index.

The destination layer 2 ID is a (ProSe) UE ID of the relay UE connected to the remote UE, and may be represented by using 24 bits.

The buffer size is a size of data in a buffer of the remote UE, and may be represented by using 24 bits.

The BSR type is used to indicate that the BSR is a long BSR, a short BSR, or a truncated BSR, and may be represented by using 2 bits or 1 bit.

(2) An existing SCI format is reused. Values of some fields in an SCI format 0 are set to special values. For example, a value of an original field, in the SCI format 0, that has a length of 1 bit and that is used to indicate frequency hopping (Frequency hopping) is set to 0 or 1, values of all bits corresponding to an original field that is used to indicate resource block assignment (Resource block assignment) and that is in the SCI format 0 are set to 0 or 1, and new fields are used to replace the currently existing fields, so that updated SCI (for example, an SCI format shown in Table 3 below) may include one or more types of the following information: a remote UE index, a buffer size, and a BSR type. Definitions of the remote UE index, the buffer size, and the BSR type are described in (1), and details are not described herein again.

It should be noted that in the case described in (2), the base station needs to assign, to each relay UE, a dedicated resource pool used to receive SCI, and only remote UE connected to the relay UE can send the SCI by using a resource in the resource pool.

TABLE 3

| Field | Number of bits |
| --- | --- |
| Frequency hopping | 1 bit and set to 0 or 1 |
| Resource block assignment | All bits are set to 0 or 1 |
| Remote UE index | 4 bits |
| Buffer size | 24 bits |
| BSR type | 2 bits or 1 bit |

Manner 3: The remote UE receives an SL grant assigned by the base station.

The remote UE sends, to the relay UE by using a resource indicated by the SL grant, a MAC PDU that includes the BSR.

In this way, the remote UE may send, to the relay UE, SCI and the MAC PDU including the BSR, so that the relay UE receives, based on the received SCI, the MAC PDU on a resource specified by the SCI, and obtains, from the MAC PDU, the BSR sent by the remote UE.

In the manner 3, a format of the MAC PDU may be described in the manner 1, and details are not described herein again. The only difference is that, in the manner 1, the MAC PDU may include a MAC SDU that carries data, or may not include a MAC SDU that carries data; but in the manner 3, when SL data is transmitted between the remote UE and the relay UE by using the resource indicated by the SL grant assigned by the base station, the MAC SDU includes a MAC SDU that carries data.

Optionally, in the manner 3, the remote UE may receive, in the following manner, the SL grant assigned by the base station.

When the remote UE needs to transmit data, the remote UE triggers a scheduling request (SR), and sends the SR to the relay UE. The scheduling request is used to request the base station to assign the SL grant.

For example, in the foregoing process, the remote UE may send the SR to the relay UE in the following manner.

The remote UE obtains a control signaling resource pool configured by the base station for the remote UE, where the control signaling resource pool is only used by the remote UE to transmit the scheduling request.

The remote UE selects a fourth resource from the control signaling resource pool, and sends, to the relay UE by using the fourth resource, SCI that includes the SR. The fourth resource may be any resource in the control signaling resource pool.

The SCI that carries the SR may include one or more types of information: a remote UE index and a destination layer 2 ID. Definitions of the remote UE index and the destination layer 2 ID are described in (1), and details are not described herein again.

Optionally, in step 102, the relay UE may send, to the base station in either one of the following manner (1) or manner (2), the at least one received BSR sent by the at least one remote UE.

Manner (1): The relay UE performs combination processing on the at least one BSR to generate one relay BSR, where the relay BSR includes BSRs sent by all remote UEs.

The relay UE obtains a UL grant assigned by the base station.

The relay UE sends, to the base station by using a resource indicated by the UL grant assigned by the base station, a VIAC PDU that carries the relay BSR.

For example, the relay UE may obtain, in the following manner, the UL grant assigned by the base station: When the relay UE needs to transmit data, the relay UE triggers an SR used to request the base station to assign the UL grant, and sends the SR to the base station.

In this way, the relay UE may combine a plurality of BSRs together to include the BSRs in the MAC PDU, and send the MAC PDU to the base station, so that the base station assigns an SL grant to each remote UE based on the received BSR.

In the manner (1), the MAC PDU may include a MAC header, a plurality of MAC CEs, and a MAC SDU, and the MAC header may include a plurality of MAC subheaders.

The relay BSR is used as a MAC CE and is carried in the MAC PDU, so that the relay BSR is sent to the base station by using the MAC PDU. It should be noted that, in the manner (1), the relay BSR used as a VIAC CE may be referred to as a relay BSR MAC CE. In addition, the plurality of MAC subheaders include one MAC subheader corresponding to the relay BSR MAC CE, and the MAC subheader includes an LCID used to indicate that the MAC CE corresponding to the MAC subheader is a relay BSR MAC CE.

Optionally, to support the LCID in indicating the relay BSR MAC CE, one reserved value may be selected from current reserved values of an LCID of an uplink shared channel as an LCID value for indicating the relay BSR MAC CE. For example, as shown in Table 4 below, 10101 may be used to indicate a MAC CE including the relay BSR. An indication function of another value of the LCID is still the same as that of the existing value, and details are not described herein again.

TABLE 4

| Index | LCID values |
| --- | --- |
| 00000 | CCCH |
| 00001-01010 | Identity of the logical channel |
| 01011 | CCCH |
| 01100-10100 | Reserved |
| 10101 | Relayed BSR |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Specifically, to be convenient for the base station to distinguish that a BSR sent by which remote UE is included in the relay BSR VIAC CE, in the manner (1), a format of the relay BSR MAC CE may use the following design solution. The relayed BSR MAC CE may include at least one group of BSR information that is in a one-to-one correspondence with the at least one remote UE, in other words, one remote UE corresponds to one group of BSR information. Each group of BSR information may include one or more types of the following information: a remote UE index, a BSR type, a logical channel group quantity (LCG Number), a logical channel group identification (LCG ID), and a buffer size.

The remote UE index in each group of BSR information is a unique identifier used when remote UE corresponding to the group of information is connected to the relay UE.

The BSR type is used to notify the base station of a type of a BSR reported by the remote UE corresponding to the group of information, for example, the BSR may be one of a long BSR, a short BSR, and a truncated BSR, or one of a truncated sidelink BSR and a sidelink BSR.

The LCG number is used to indicate a quantity of LCGs of the buffer size reported by the remote UE corresponding to the group of information.

The LCG ID is used to identify a logical channel group of the remote UE corresponding to the group of information.

The buffer size is a size of data in a buffer corresponding to the corresponding LCG ID.

For example, in the manner (1), an implementable format of the relay BSR MAC CE is that the relayed BSR MAC CE includes at least one group of BSR information that is in a one-to-one correspondence with the at least one remote UE, and each group of BSR information includes the following information: a remote UE index, a BSR type, an LCG number, an LCG ID, and a buffer size.

Figures 1, 5A:
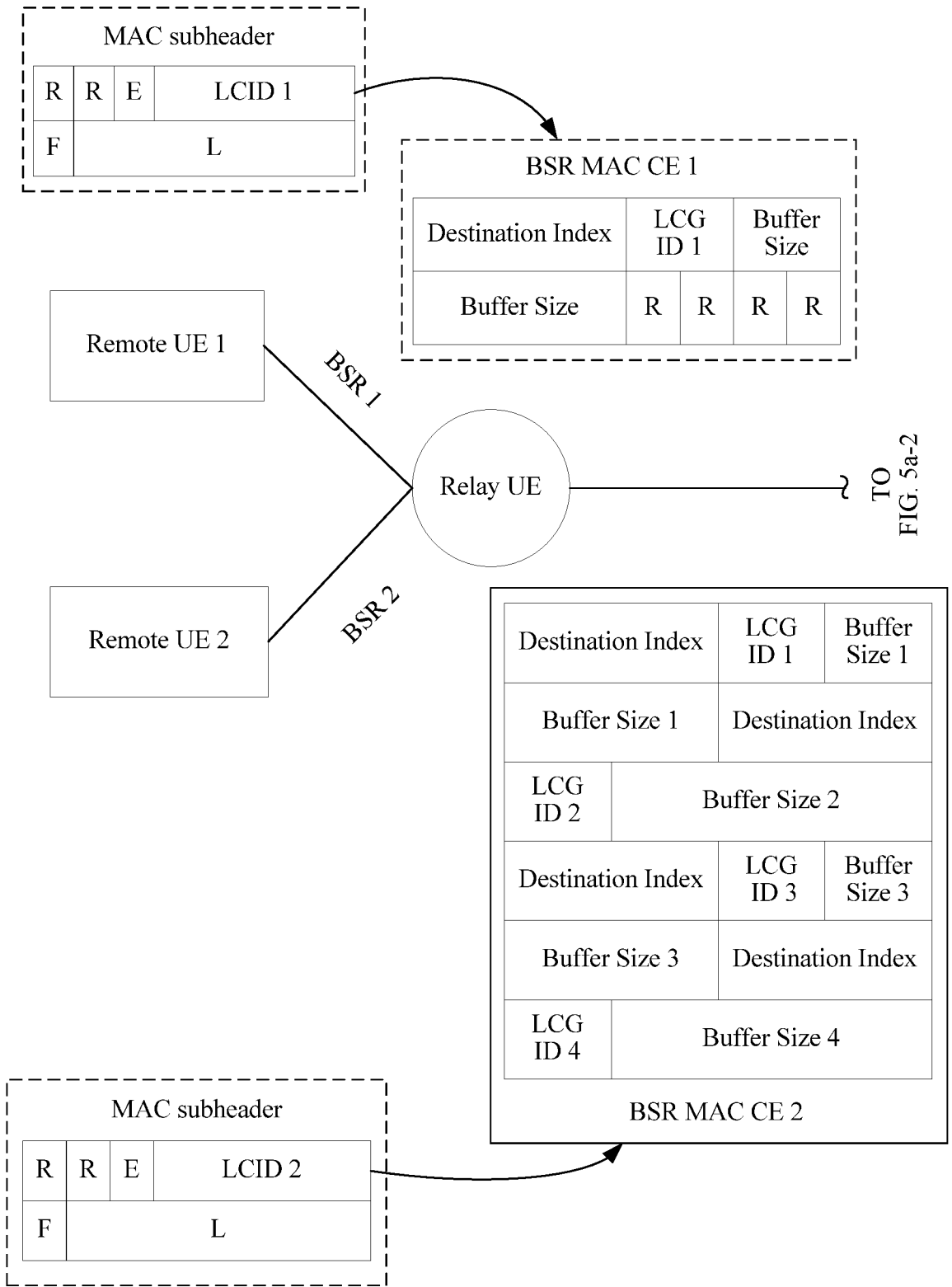
Figures 2, 5A:
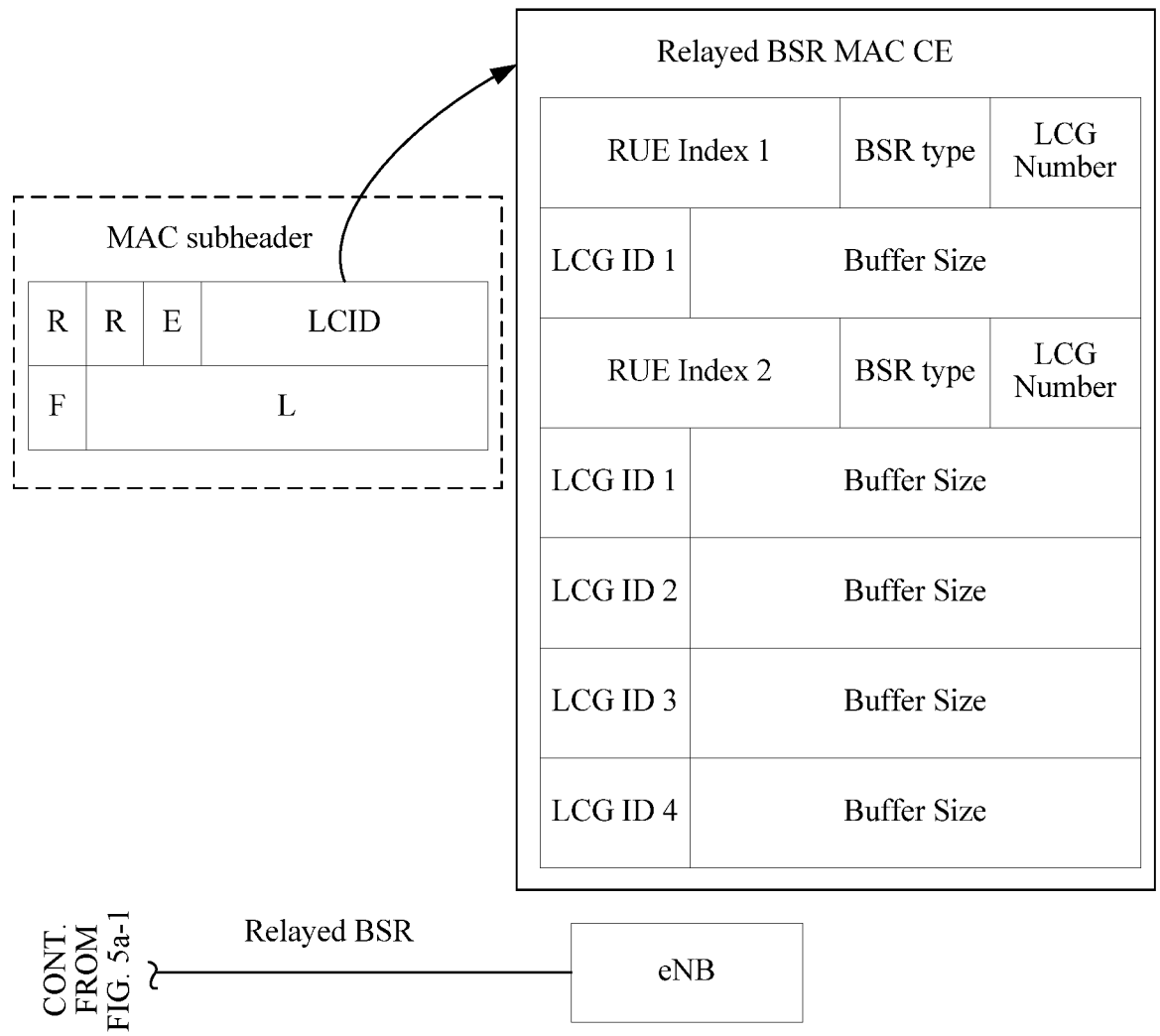

For example, as shown in FIG. 5a-1 and FIG. 5a-2, relay UE simultaneously receives a BSR 1 sent by remote UE 1 and a BSR 2 sent by remote UE 2. In addition, the BSR 1 is used as a BSR MAC CE 1 indicated by an LCID 1, the BSR 2 is used as a BSR MAC CE 2 indicated by an LCID 2, an index of the remote UE 1 is a remote UE index 1 (RUE Index 1 for short), and an index of the remote UE 2 is a remote UE index 2 (RUE Index 2 for short). The relay UE receives the BSR 1 and the BSR 2, combines the BSR 1 and the BSR 2 together as a relay BSR, and places the relay BSR into a MAC CE, namely, a relay BSR MAC CE. In addition, an LCID in a MAC subheader in a MAC PDU is used to indicate the relay BSR MAC CE.

For example, in the manner (1), another implementable format of the relay BSR MAC CE is that the relayed BSR MAC CE includes at least one group of BSR information that is in a one-to-one correspondence with the at least one remote UE, and each group of BSR information includes the following information: a remote UE index, a BSR type, an LCG ID, and a buffer size.

Figures 1, 5B:
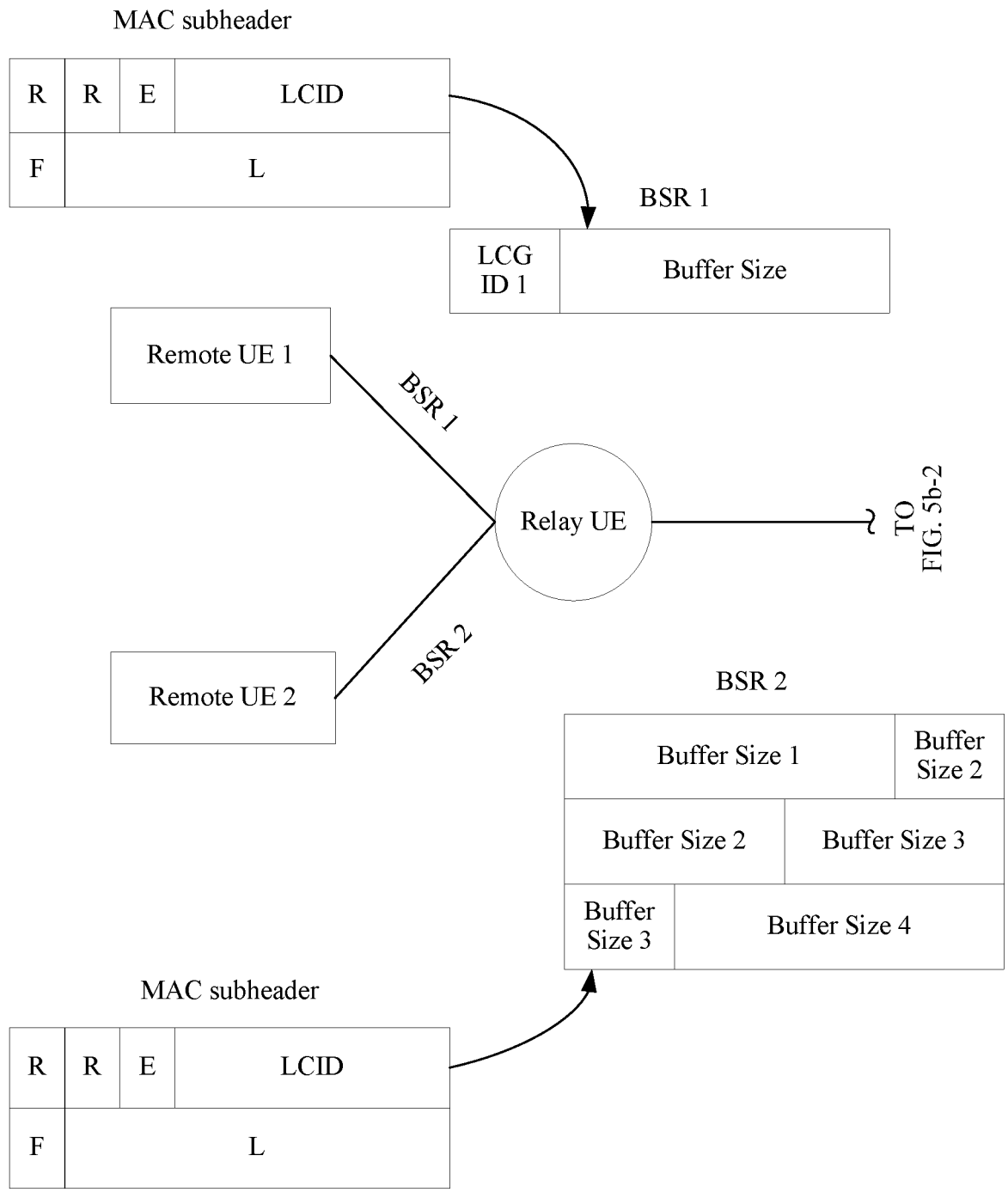
Figure 5B:
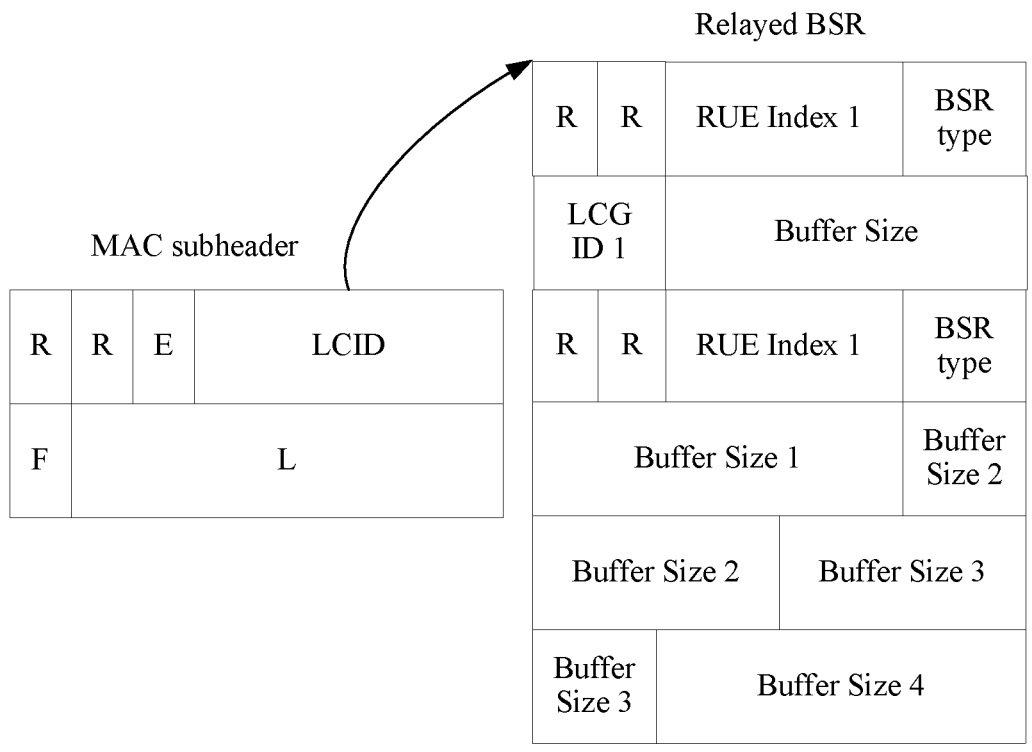
Figure 2:
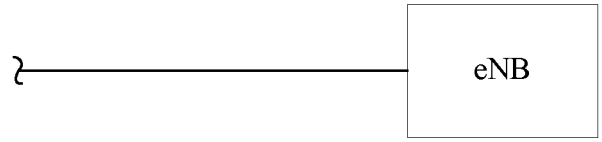

For example, as shown in FIG. 5b-1 and FIG. 5b-2, relay UE uses, as a relay BSR, a BSR 1 sent by remote UE 1 and a BSR 2 sent by remote UE 2 that are simultaneously received, places the relay BSR into a MAC CE, namely, a relay BSR MAC CE, and sends the relay BSR MAC CE to the base station. In addition, an LCID in a MAC subheader in a MAC PDU is used to indicate the relay BSR MAC CE.

Manner (2): The relay UE separately processes the at least one BSR to generate at least one relay BSR, where the at least one relay BSR is in a one-to-one correspondence with the remote UE.

The relay UE obtains a UL grant assigned by the base station.

The relay UE sends, to the base station based on a resource indicated by the UL grant assigned by the base station, a MAC PDU that carries the at least one relay BSR.

For example, the relay UE may obtain, in the following manner, the UL grant assigned by the base station: When the relay UE needs to send the relay BSR but has no UL grant, the relay UE triggers an SR used to request the base station to assign the UL grant, and sends the SR to the base station.

Optionally, in the manner (2), the relay UE may be used as a MAC CE and carried in a MAC PDU described in any one of solution (2.1) to solution (2.5), and sent to the base station.

Solution (2.1): The MAC PDU may include a MAC header and at least one MAC CE. The at least one MAC CE may be in a one-to-one correspondence with the at least one relay BSR, and each of the at least one MAC CE is used to carry a relay BSR corresponding to the MAC CE. The MAC CE carrying the relay BSR may be referred to as a relay BSR MAC CE. In addition, the VIAC header may include at least one VIAC subheader that is in a one-to-one correspondence with at least one relay BSR MAC CE, each of the at least one VIAC subheader includes an LCID, and the LCID included in each MAC subheader is used to indicate a relay BSR MAC CE corresponding to the MAC subheader, and a format of the relay BSR MAC CE.

In Solution (2.1), the format of the relay BSR MAC CE may be three formats: a long BSR MAC CE, a short BSR MAC CE, and a truncated BSR MAC CE. The long BSR MAC CE is a MAC CE that carries a long BSR, the short BSR MAC CE is a MAC CE that carries a short BSR, and the truncated BSR MAC CE is a MAC CE that carries a truncated BSR.

In Solution (2.1), the relay BSR MAC CE may include one or more types of information: an index of remote UE corresponding to the relay BSR MAC CE, an LCG ID included in a BSR reported by the remote UE, and a buffer size corresponding to each logical channel group in the BSR reported by the remote UE.

Figure 6A:
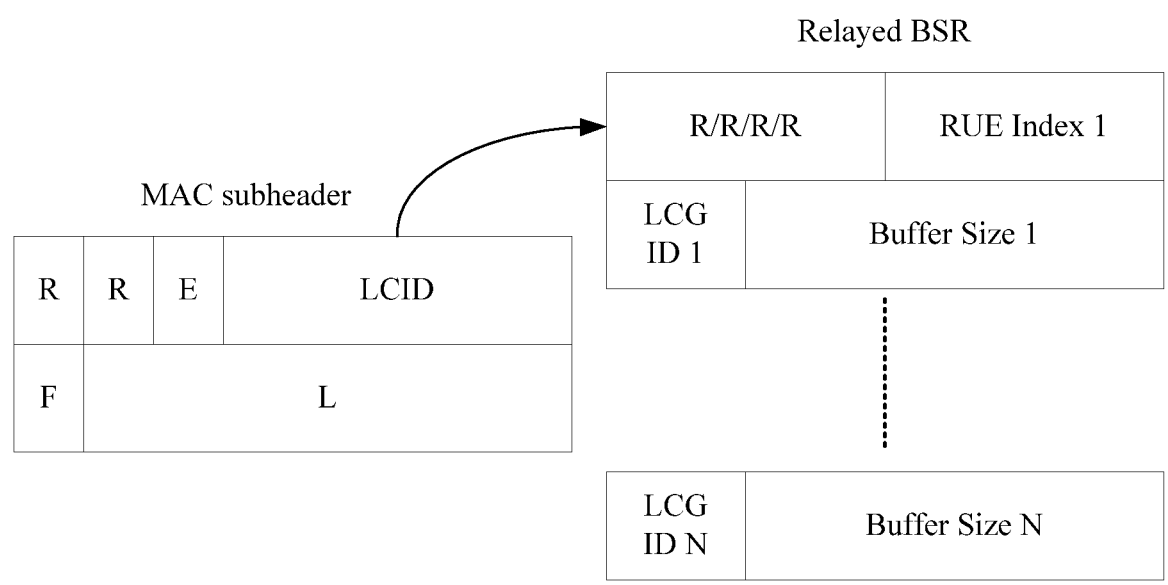
FIG. 6a is a schematic diagram of a format of a MAC PDU according to an embodiment of the present invention.

For example, as shown in FIG. 6a, remote UE 1 sends a BSR 1 to a relay BSR. The BSR 1 is used to indicate, to the base station, buffer sizes on LCG IDs represented by an LCG ID 1 to an LCG ID N. After receiving the BSR 1 sent by the remote UE 1, the relay UE changes the BSR 1 to a relay BSR through processing, places the processed relay BSR into a MAC CE of a MAC PDU, namely, a relay BSR MAC CE, and sends the relay BSR to the base station. In addition, an LCID in a MAC subheader in the MAC PDU is used to indicate the relay BSR MAC CE, and the relay BSR MAC CE includes a remote UE index 1, the LCG ID 1 to the LCG ID N, and a buffer size corresponding to each LCG ID.

Solution (2.2): The MAC PDU may include a MAC header and at least one MAC CE. The at least one IIAC CE is in a one-to-one correspondence with the at least one remote UE, and each of the at least one MAC CE may include a relay BSR of remote UE corresponding to the VIAC CE. In this solution, the IIAC CE that includes the relay BSR may be referred to as a relay BSR MAC CE.

To indicate the remote UE and the MAC CE that includes the relay BSR of the remote UE, optionally, in Solution (2.2), for any one of the at least one remote UE, for example, first remote UE, the MAC header may include at least one IIAC subheader. The at least one MAC subheader may include two MAC subheaders corresponding to the first remote UE. Information included in the two MAC subheaders is used to indicate the first remote UE and a MAC CE that includes a relay BSR of the first remote UE. Specific implementation is as follows.

One MAC subheader may include an index of the first remote UE.

The other MAC subheader may include an LCID, and the LCID included in the MAC subheader is used to indicate that a MAC CE corresponding to the first remote UE is a relay BSR MAC CE and indicate a format of the relay BSR MAC CE.

It may be understood that, when a quantity of MAC CEs of the first remote UE is relatively large, there are a plurality of MAC subheaders corresponding to the MAC CE. A quantity of MAC subheaders is not limited to the foregoing two MAC subheaders.

In other words, it can be learned from the foregoing that, in Solution (2.2), the at least one relay BSR corresponding to the at least one remote UE is separately used as at least one MAC CE and carried in the MAC PDU, and sent to the base station. In addition, there are a plurality of MAC subheaders corresponding to the same remote UE in the MAC subheader, and the plurality of MAC subheaders corresponding to the same remote UE are used to indicate the remote UE and the MAC CE that includes the relay BSR of the remote UE.

Figure 6B:
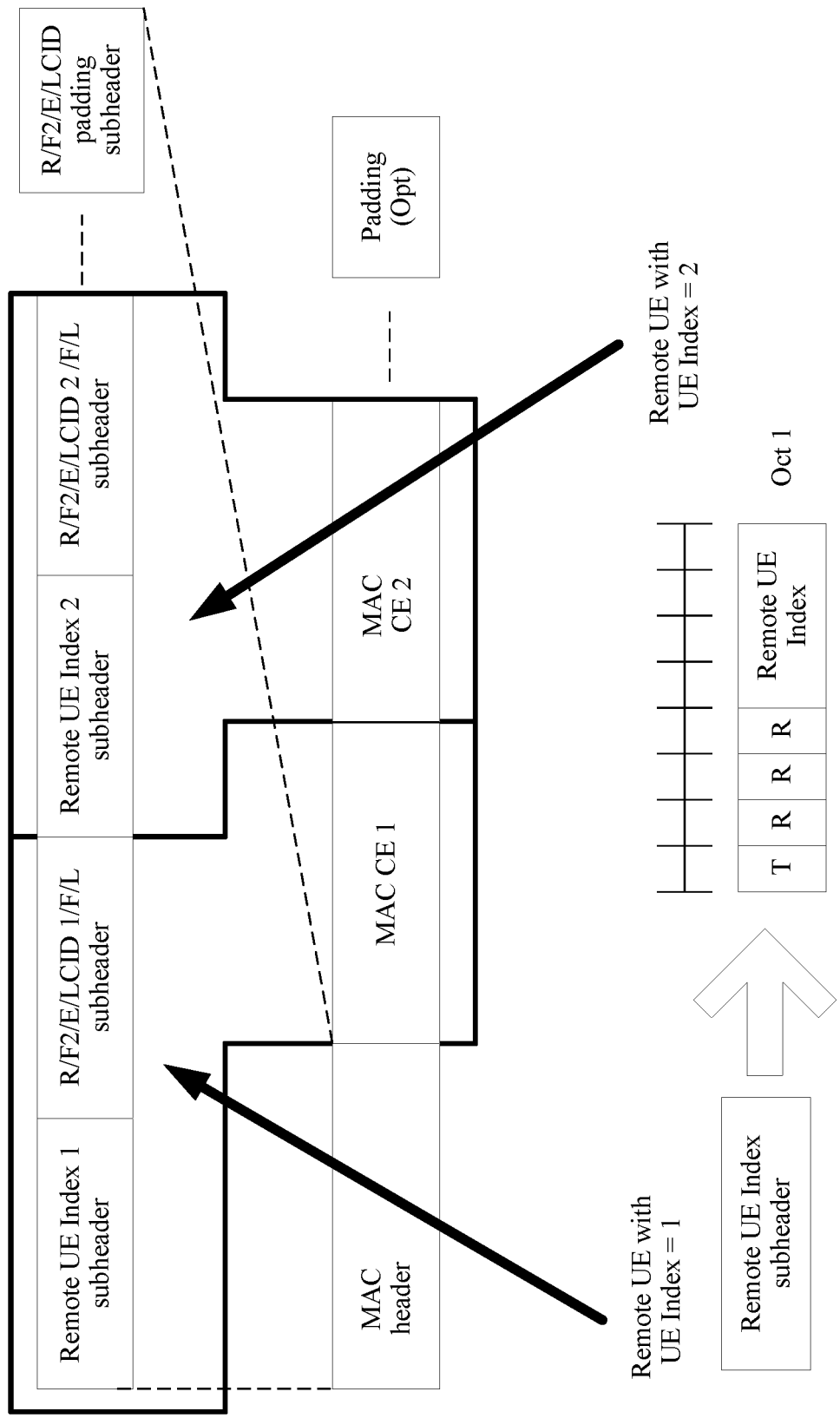
FIG. 6b is a schematic diagram of a format of a MAC PDU according to an embodiment of the present invention.

For example, as shown in FIG. 6b, if relay UE simultaneously receives a BSR 1 sent by remote UE 1 and a BSR 2 sent by remote UE 2, the relay UE respectively pads a MAC CE 1 and a MAC CE 2 with the BSR 1 sent by the remote UE 1 and the BSR 2 sent by the remote UE 2 that are simultaneously received; pads a MAC subheader 1 in a MAC PDU with an index of the remote UE 1: a remote UE index 1; pads a MAC subheader 2 with an LCID 1 used to indicate that the MAC CE 1 is a relay BSR MAC CE and indicate a format of the relay BSR MAC CE; pads a MAC subheader 3 with an index of the remote UE 2: a remote UE index 2; and pads a MAC subheader 4 with an LCID 2 used to indicate that the MAC CE 2 is a relay BSR MAC CE and indicate a format of the relay BSR MAC CE.

It should be noted that, in Solution (2.2), as shown in FIG. 6b, in addition to a remote UE index, a MAC subheader padded with the remote UE index may further include another bit, such as a T bit and a reserved (R) bit. A value of the T bit may be used to indicate whether a next MAC subheader adjacent to the MAC subheader is a newly defined subheader that includes the remote UE index, or is similar to a subheader that includes an LCID and that is currently defined in a MAC PDU on an uplink/downlink. In addition, as shown in FIG. 6b, the MAC PDU may further include a MAC SDU and blank padding (Padding). The MAC header may further include a MAC subheader corresponding to the MAC SDU and a padding subheader corresponding to the padding. This is not limited in this embodiment of the present invention.

In addition, currently, there are two reserved bits in the MAC subheader that includes the LCID. One of the reserved bits may be used to indicate whether a next MAC subheader adjacent to the MAC subheader is a newly defined subheader that includes the remote UE index, or is similar to a subheader that includes an LCID and that is currently defined in a MAC PDU on an uplink/downlink.

Solution (2.3): The MAC PDU may include a MAC header and at least one MAC CE, and the MAC header includes at least one MAC subheader.

For any one of the at least one remote UE, for example, second remote UE, the at least one MAC CE may include two MAC CEs corresponding to the second remote UE. One MAC CE may include an index of the second remote UE, and the other MAC CE may include a relay BSR corresponding to the second remote UE.

To indicate the MAC CE that includes the index of the second remote UE and the MAC CE that includes the relay BSR of the remote UE, correspondingly, for two MAC subheaders that may correspond to the second remote UE in the at least one VIAC subheader, one includes an LCID used to indicate that the MAC CE includes the index of the second remote UE, and the other one includes an LCID used to indicate that the MAC CE is a relay BSR MAC CE of the relay BSR corresponding to the second remote UE and indicate a format of the relay BSR MAC CE.

In other words, it can be learned from the foregoing that, in Solution (2.3), for any remote UE, the index of the remote UE and the relay BSR of the remote UE are used as MAC CEs and carried in the MAC PDU, and sent to the base station. In addition, there are a plurality of MAC subheaders corresponding to the remote UE in the MAC subheader. In the plurality of MAC subheaders, the MAC subheader that includes the LCID is used to indicate the MAC CE that includes the index of the remote UE. In the plurality of MAC subheaders, another MAC subheader that includes the LCID is used to indicate the MAC CE that includes the relay BSR of the remote UE.

Figure 6C:
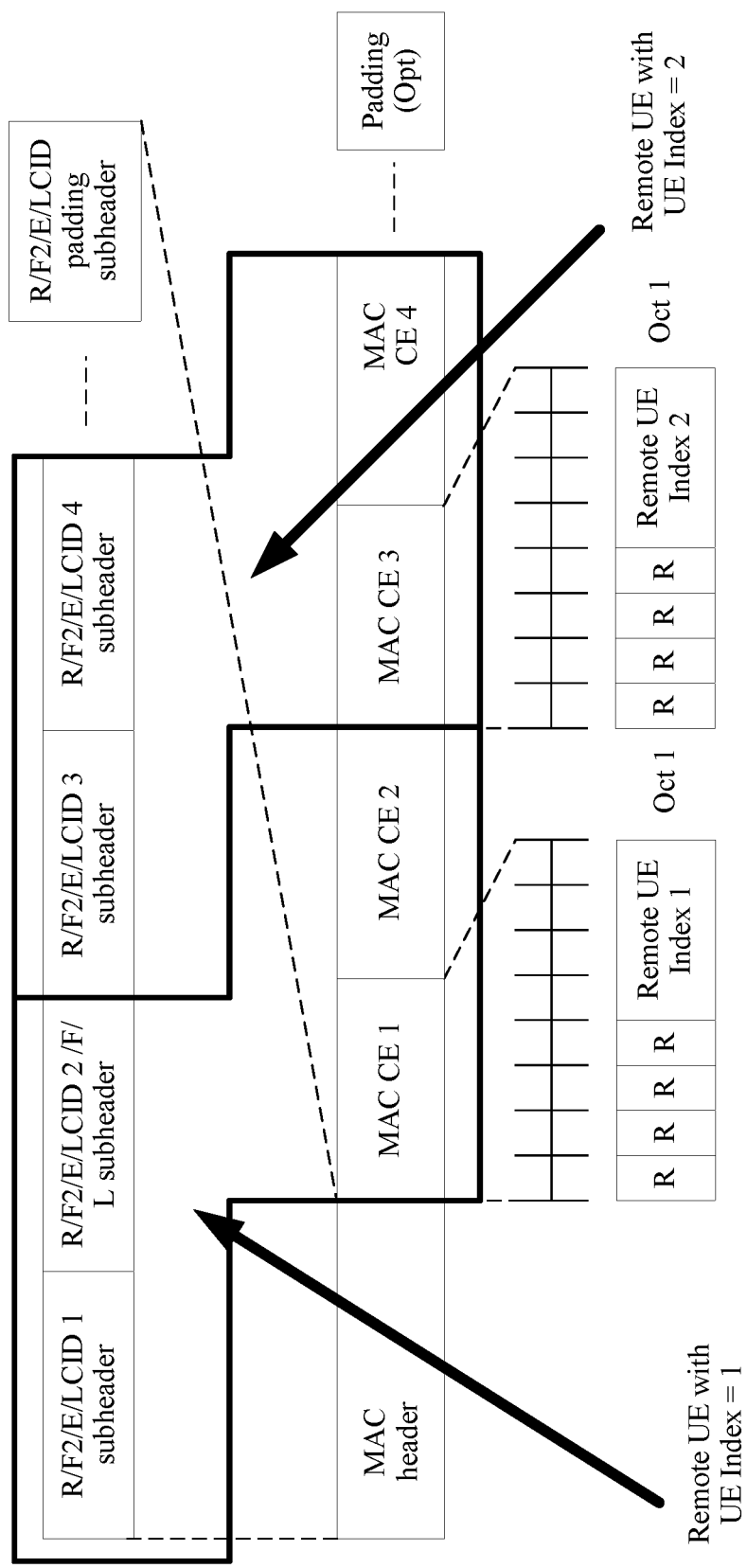
FIG. 6c is a schematic diagram of a format of a MAC PDU according to an embodiment of the present invention.

For example, as shown in FIG. 6c, if relay UE simultaneously receives a BSR 1 sent by remote UE 1 and a BSR 2 sent by remote UE 2, the relay UE respectively pads a MAC CE 1, a MAC CE 2, a MAC CE 3, and a MAC CE 4 with the BSR 1 sent by the remote UE 1 and the BSR 2 sent by the remote UE 2 that are simultaneously received, an index of the remote UE 1, and an index of the remote UE 2; pads a MAC subheader 1 in a MAC PDU with an LCID 1 used to indicate that the MAC CE 1 is a MAC CE that includes the index of the remote UE 1; pads a MAC subheader 2 with an LCID 2 used to indicate that the MAC CE 2 is a relay BSR MAC CE that includes the BSR 1 sent by the remote UE 1, and indicate a format of the relay BSR MAC CE; pads a MAC subheader 3 with an LCID 3 used to indicate that the MAC CE 3 is a MAC CE that includes the index of the remote UE 2; and pads a MAC subheader 4 with an LCID 4 used to indicate that the MAC CE 4 is a relay BSR MAC CE that includes the BSR 2 sent by the remote UE 2, and indicate a format of the relay BSR MAC CE.

It should be noted that, in Solution (2.3), as shown in FIG. 6c, in addition to a remote UE index, a MAC CE padded with the remote UE index may further include another bit, such as a reserved (R) bit. In addition, as shown in FIG. 6c, the MAC PDU may further include a MAC SDU and blank padding (Padding). The MAC header may further include a MAC subheader corresponding to the MAC SDU and a padding subheader corresponding to the padding. This is not limited in this embodiment of the present invention.

Solution (2.4): The MAC PDU may include a MAC header and at least one MAC CE. The at least one MAC CE is in a one-to-one correspondence with the at least one remote UE, and each of the at least one MAC CE may include a relay BSR of remote UE corresponding to the MAC CE. In this solution, the MAC CE that includes the relay BSR may be referred to as a relay BSR MAC CE.

To indicate specific remote UEs that correspondingly have relay BSRs and a MAC CE that includes the relay BSR of the remote UE, in Solution (2.4), the MAC header may include one subheader that includes a bitmap (bitmap) and at least one MAC subheader that is in a one-to-one correspondence with at least one relay BSR MAC CE.

The bitmap included in the MAC subheader includes at least one bit that is in a one-to-one correspondence with the at least one remote UE, and each bit is used to indicate whether the current MAC PDU includes a MAC SDU and/or a BSR MAC CE BSR of remote UE corresponding to the bit. For example, if the current MAC PDU includes a MAC SDU and/or a BSR MAC CE of remote UE whose index value is n, a value of a bit n in the bitmap corresponding to the MAC PDU is set to 1. If the current MAC PDU does not include a MAC SDU and/or a BSR MAC CE of remote UE whose index value is n, a value of a bit n in the bitmap corresponding to the MAC PDU is set to 0. Alternatively, meanings represented by 1 and 0 are opposite. In addition, a bit 0 in the bitmap may be used to represent whether the current VIAC PDU includes a MAC SDU and/or a BSR MAC CE of the relay UE. A manner of determining a bit in the bitmap may be, for example, that, a leftmost bit of a first byte is 0, and bits are successively 1, 2, . . . , and 7 to the right; and a leftmost bit of a second byte is 8, and so on. A quantity of bits in the bitmap depends on a maximum quantity of remote UEs that can be connected to the relay UE, for example, may be 16 bits.

Each of the at least one MAC subheader that is in a one-to-one correspondence with the at least one relay BSR MAC CE includes an LCID used to indicate that a MAC CE corresponding to the MAC subheader is a relay BSR MAC CE, and indicate a format of the relay BSR MAC CE.

In other words, it can be learned from the foregoing that, in Solution (2.4), the relay BSR of the at least one remote UE is separately used as the at least one MAC CE and carried in the MAC PDU, and sent to the base station. In addition, in the MAC subheaders, the MAC subheader that includes the bitmap is used to indicate that the MAC PDU carries relay BSRs of which remote UEs, and the MAC subheader that includes the LCID is used to indicate the relay BSR MAC CE that carries the relay BSR.

Figure 6D:
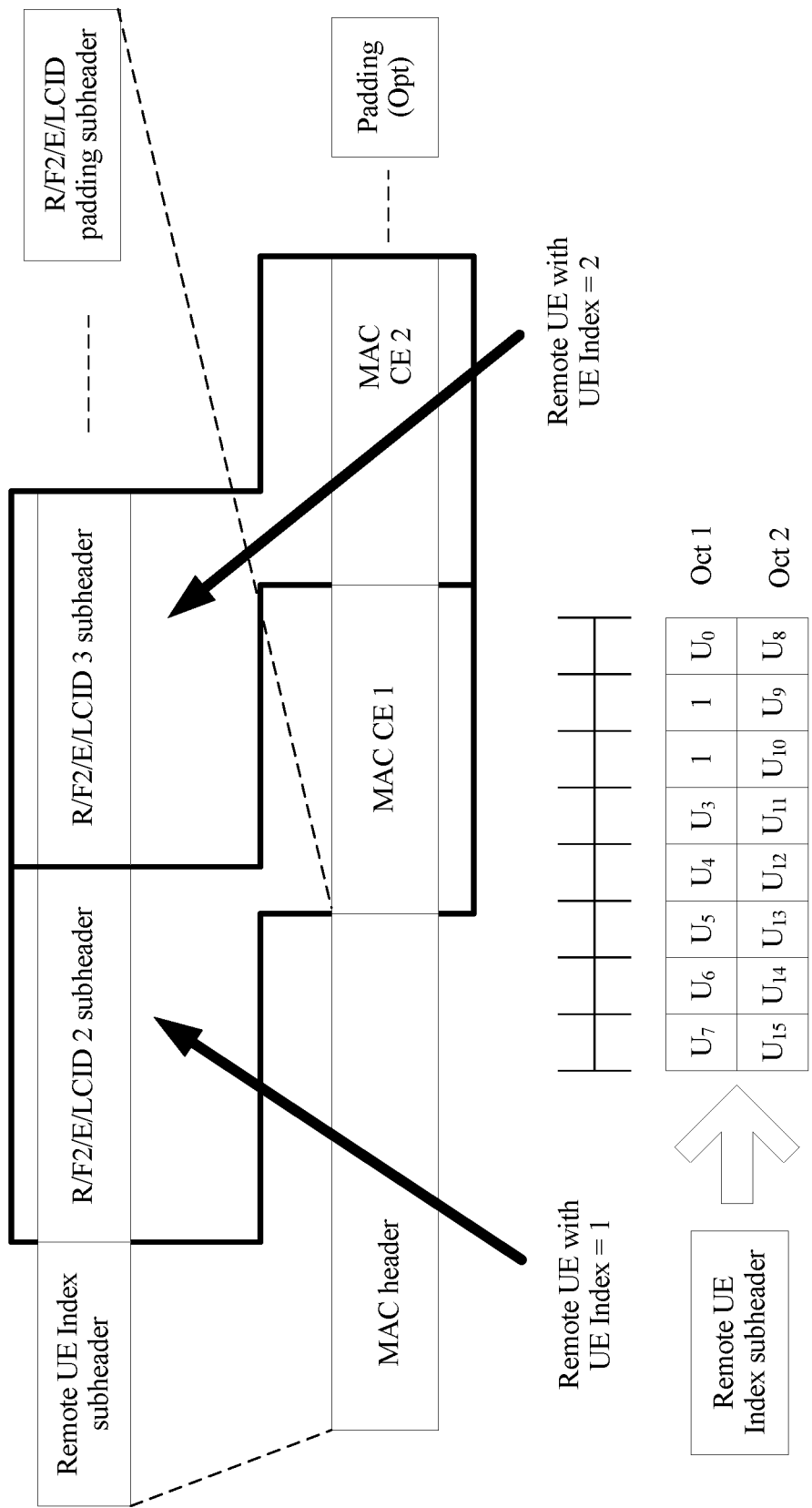
FIG. 6d is a schematic diagram of a format of a MAC PDU according to an embodiment of the present invention.

For example, as shown in FIG. 6d, if relay UE simultaneously receives a BSR 1 sent by remote UE 1 and a BSR 2 sent by remote UE 2, the relay UE respectively pads a MAC CE 1 and a MAC CE 2 with the BSR 1 sent by the remote UE 1 and the BSR 2 sent by the remote UE 2 that are simultaneously received. In addition, the relay UE separately pads, with 1, locations corresponding to the remote UE 1 and the remote UE 2 in a bitmap in a MAC subheader 1, and pads other parts with 0; pads a MAC subheader 2 with an LCID 1 used to indicate that the MAC CE 1 is a relay BSR MAC CE that includes the BSR 1 sent by the remote UE 1, and indicate a format of the relay BSR MAC CE; and pads a MAC subheader 3 with an LCID 2 used to indicate that the MAC CE 2 is a relay BSR MAC CE that includes the BSR 2 sent by the remote UE 2, and indicate a format of the relay BSR MAC CE.

It should be noted that, in Solution (2.4), as shown in FIG. 6d, the MAC PDU may further include a MAC SDU and blank padding (Padding). The MAC header may further include a MAC subheader corresponding to the MAC SDU and a padding subheader corresponding to the padding. This is not limited in this embodiment of the present invention.

Solution (2.5): The MAC PDU may include a MAC header and at least one MAC CE. The at least one MAC CE may include one MAC CE that includes a bitmap (bitmap) and at least one MAC CE that is in a one-to-one correspondence with the at least one remote UE. Each of the at least one MAC CE is used to carry a relay BSR of remote UE corresponding to the MAC CE. In this solution, the MAC CE that includes the relay BSR may be referred to as a relay BSR MAC CE.

The bitmap in the MAC CE includes at least one bit that is in a one-to-one correspondence with the at least one remote UE, and each bit is used to indicate whether the current MAC PDU includes a MAC SDU and/or a BSR MAC CE BSR of remote UE corresponding to the bit. For example, if the current MAC PDU includes a MAC SDU and/or a BSR MAC CE of remote UE whose index value is n, a value of a bit n in the bitmap corresponding to the MAC PDU is set to 1. If the current MAC PDU does not include a MAC SDU and/or a BSR MAC CE of remote UE whose index value is n, a value of a bit n in the bitmap corresponding to the MAC PDU is set to 0. Alternatively, meanings represented by 1 and 0 are opposite. In addition, a bit 0 in the bitmap may be used to represent whether the current MAC PDU includes a MAC SDU and/or a BSR MAC CE of the relay UE. A manner of determining a bit in the bitmap may be, for example, that, a leftmost bit of a first byte is 0, and bits are successively 1, 2, . . . , and 7 to the right; and a leftmost bit of a second byte is 8, and so on. A quantity of bits in the bitmap depends on a maximum quantity of remote UEs that can be connected to the relay UE, for example, may be 16 bits.

To indicate the VIAC CE that carries the bitmap and the VIAC CE that includes the relay BSR of the remote UE, in Solution (2.5), the MAC header may include a MAC subheader that includes an LCID, where the LCID included in the VIAC subheader is used to indicate the MAC CE that includes the bitmap; and a MAC subheader that is in a one-to-one correspondence with at least one relay BSR MAC CE, where each of the MAC subheader that is in a one-to-one correspondence with the at least one relay BSR MAC CE includes an LCID used to indicate that a MAC CE corresponding to the MAC subheader is a relay BSR MAC CE, and indicate a format of the relay BSR MAC CE.

In other words, it can be learned from the foregoing that, in Solution (2.5), the VIAC CE that includes the bitmap is used to indicate that the MAC PDU carries relay BSRs of which remote UEs, and the relay BSR of the at least one remote UE is separately used as at least one MAC CE and carried in the MAC PDU, and sent to the base station. In addition, the MAC subheader that includes the LCID is used to indicate the relay BSR MAC CE.

Figure 6E:
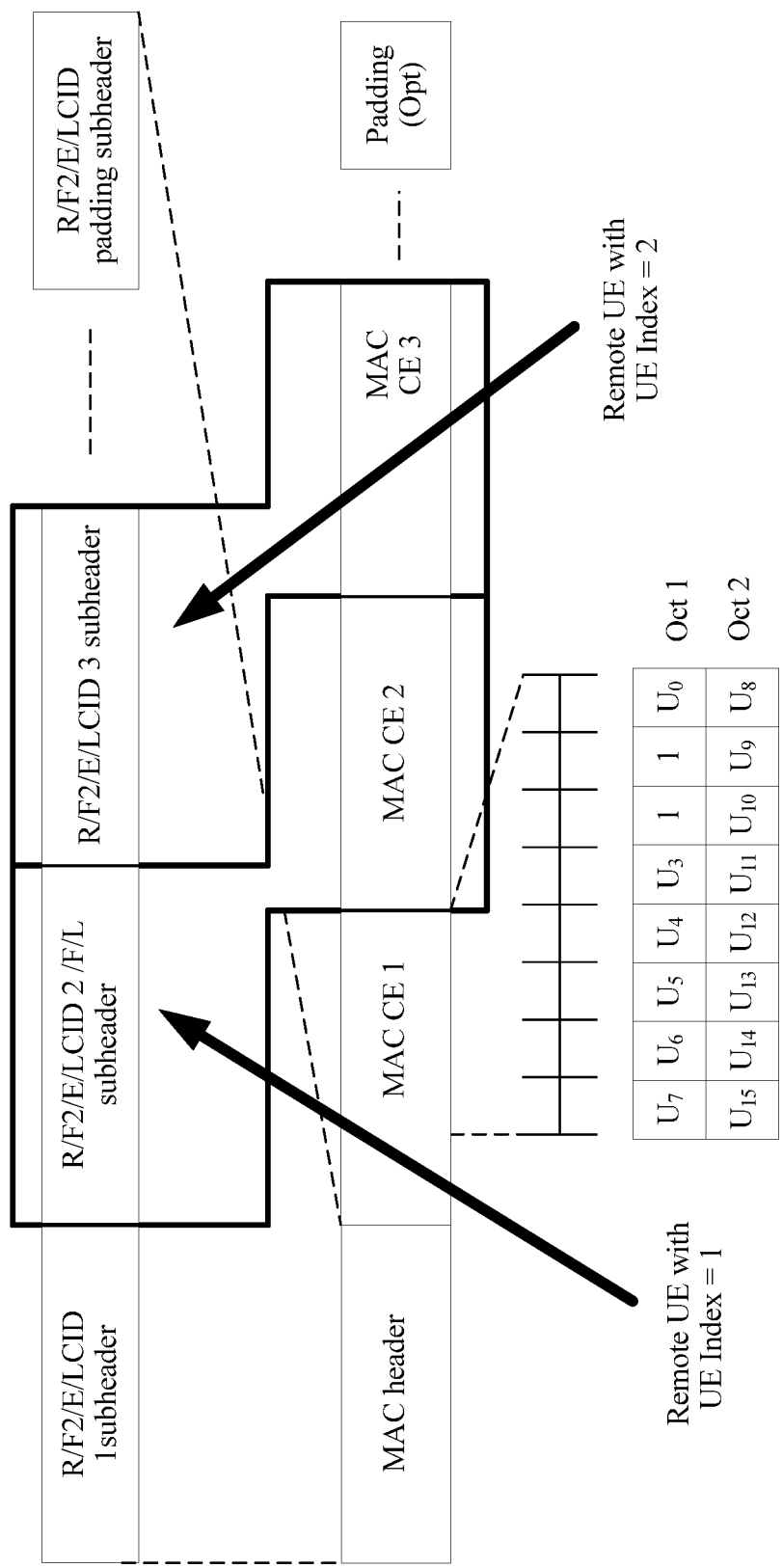
FIG. 6e is a schematic diagram of a format of a MAC PDU according to an embodiment of the present invention.

For example, as shown in FIG. 6e, if relay UE simultaneously receives a BSR 1 sent by remote UE 1 and a BSR 2 sent by remote UE 2, the relay UE separately pads, with 1, locations corresponding to the remote UE 1 and the remote UE 2 in a bitmap in a MAC CE 1, and pads other parts with 0; and respectively pads a MAC CE 2 and a MAC CE 3 with the received BSR 1 sent by the remote UE 1 and the received BSR 2 sent by the remote UE 2. In addition, the relay UE pads a MAC subheader 1 with an LCID 1 used to indicate that the MAC CE 1 is a MAC CE that includes the bitmap; pads a MAC subheader 2 with an LCID 2 used to indicate that the MAC CE 2 is a relay BSR MAC CE that includes the BSR 1 sent by the remote UE 1, and indicate a format of the relay BSR MAC CE; and pads a MAC subheader 3 with an LCID 3 used to indicate that the MAC CE 2 is a relay BSR MAC CE that includes the BSR 2 sent by the remote UE 2, and indicate a format of the relay BSR MAC CE.

It should be noted that, in Solution (2.5), as shown in FIG. 6e, the MAC PDU may further include a MAC SDU and blank padding (Padding). The MAC header may further include a MAC subheader corresponding to the MAC SDU and a padding subheader corresponding to the padding. This is not limited in this embodiment of the present invention.

In addition, in the foregoing solutions (2.2) to (2.5), the relay BSR MAC CE may include one or more types of information: a logical channel group identification included in a BSR reported by remote UE corresponding to the relay BSR MAC CE, and a size of available to-be-transmitted data on each logical channel in the BSR reported by the remote UE.

The format of the relay BSR MAC CE includes three formats: a long BSR MAC CE, a short BSR MAC CE, and a truncated BSR MAC CE.

Further, optionally, when the relay UE receives the UL grant and performs logical channel priority processing, for the currently existing uplink BSR MAC CE (BSR) and sidelink BSR MAC CE (SL BSR MAC CE), and the relay BSR MAC CE generated after processing the received BSR sent by the remote UE, these BSRs may be processed in the following priority orders, and specific implementation is as follows:

After obtaining the UL grant assigned by the base station, the relay UE processes the UL BSR MAC CE, the SL BSR MAC CE, and the relay BSR MAC CE in any one of the following priority orders:

UL BSR MAC CE>SL BSR MAC CE=Relay BSR MAC CE;

UL BSR MAC CE=Relay BSR MAC CE>SL BSR MAC CE;

UL BSR MAC CE>SL BSR MAC CE>Relay BSR MAC CE; and

UL BSR MAC CE>Relay BSR MAC CE>SL BSR MAC CE.

The UL BSR MAC CE and the SL BSR MAC CE do not include a padding BSR. A priority of the padding BSR is lower than priorities of the three BSR MAC CEs.

It should be noted that, in this embodiment of the present invention, if to-be-transmitted data that needs to be sent by the relay UE to the base station exists in a buffer of the relay UE, a BSR triggered by the relay UE is a UL BSR. If to-be-transmitted data that needs to be sent by the relay UE to the remote UE exists in a buffer of the relay UE, a BSR triggered by the relay UE is an SL BSR.

It can be learned from the foregoing that, in the technical solution shown in FIG. 3, the remote UE sends the BSR to the relay UE based on the following resources configured by the base station: the control signaling resource pool and the data resource pool, or the control signaling resource pool, or the SL grant. Alternatively, in another feasible solution of the present invention, when the foregoing resources are not preconfigured by the base station (for example, there is no available SL grant), the remote UE may also send, by using the relay UE, the SR to the base station to obtain an SL grant resource configured by the base station, and send the BSR to the relay UE by using the SL grant resource configured by the base station. Specifically, the feasible solution is shown in FIG. 7.

Figure 7:
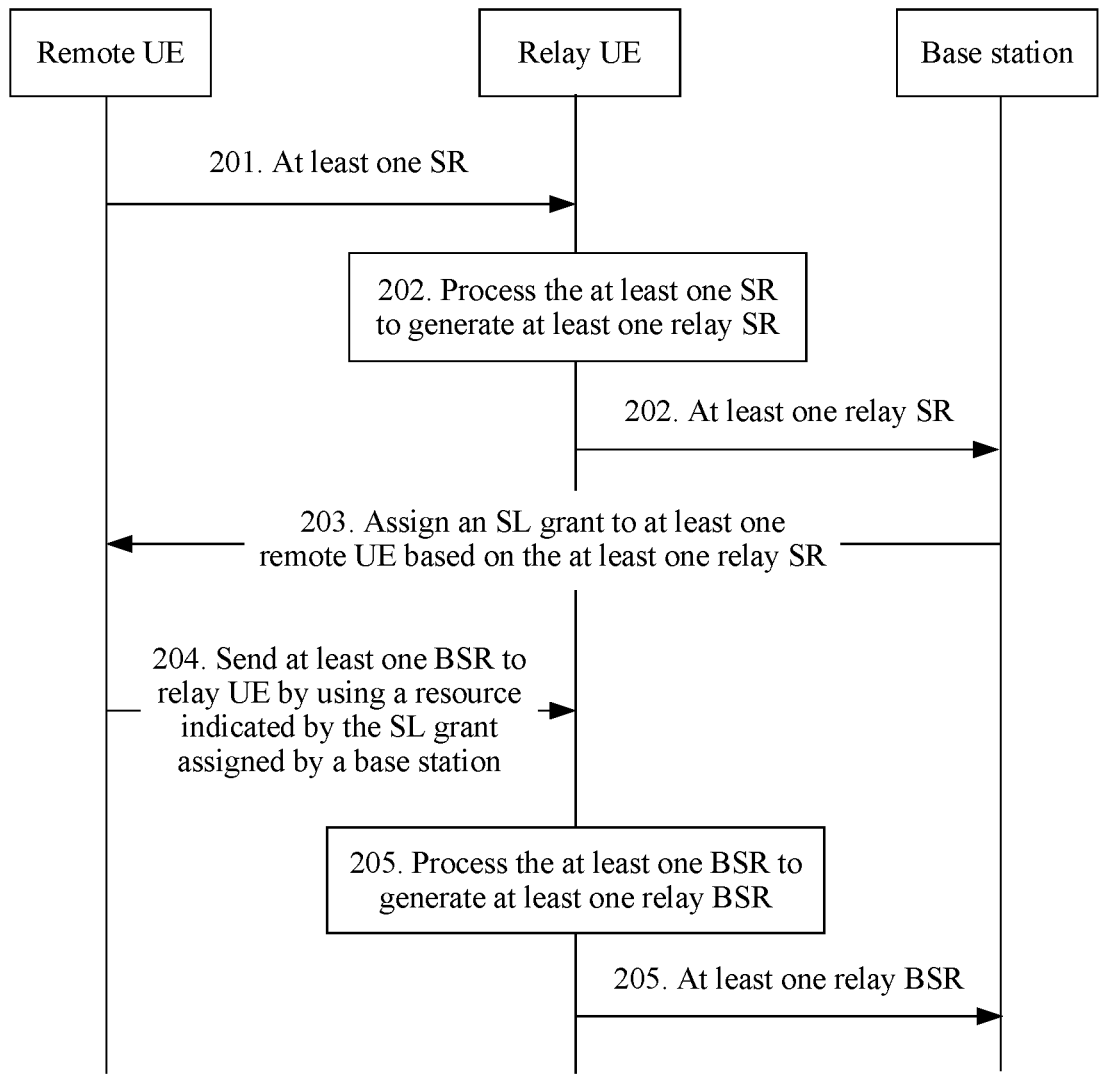
FIG. 7 is a flowchart of a resource request method according to an embodiment of the present invention.

FIG. 7 is a flowchart of another resource request method according to an embodiment of the present invention. The method is interactively performed by the devices shown in FIG. 1 or FIG. 2. The method may be applied to the following scenario: When remote UE needs to transmit data on a sidelink between the remote UE and relay UE, the remote UE triggers reporting of a BSR. In this case, if the remote UE has no available SL grant, the remote UE further triggers an SR, and transmits the SR to a base station by using the relay UE, so that the base station assigns a data transmission resource to the remote UE based on the SR reported by the remote UE. As shown in FIG. 7, the method may include the following steps.

201. At least one remote UE sends at least one SR to relay UE.

The remote UE may be remote UE connected to the relay UE, and communicates with a base station or a network by using the relay UE. The SR is used to prompt the base station that there is data to be transmitted in a buffer of the remote UE, so that the base station assigns an SL grant to the remote UE. It should be noted that one remote UE may send one SR to the relay UE, or may send a plurality of SRs to the relay UE. This is not limited in this embodiment of the present invention.

Optionally, any remote UE may send at least one SR to the relay UE in the following manner.

The remote UE obtains a control signaling resource pool configured by the base station for the remote UE, where the control signaling resource pool is only used by the remote UE to transmit the scheduling request.

The remote UE selects a fourth resource from the control signaling resource pool, and sends, to the relay UE by using the fourth resource, SCI that includes the SR. The fourth resource may be any resource in the control signaling resource pool.

When the SCI is used to transmit the SR, a new SCI format may be redefined. The SCI may include one or more types of the following information: a remote UE index and a destination layer 2 ID. Definitions of the remote UE index and the destination layer 2 ID are the same as the definitions in the solution shown in FIG. 3, and details are not described herein again.

Alternatively, an existing SCI format is reused. Values of some fields in an SCI format 0 are set to special values. For example, a value of 1 bit of an original field that is used to indicate frequency hopping (Frequency hopping) and that is in the SCI format 0 is set to 0 or 1, values of all bits of an original field that is used to indicate resource block assignment (Resource block assignment) and that is in the SCI format 0 are set to 0 or 1, and new fields are used to replace the currently existing fields, so that updated SCI (for example, an SCI format shown in Table 5 below) may include one or more types of the following information: a remote UE index and a destination layer 2 ID.

TABLE 5

| Field | Number of bits |
| --- | --- |
| Frequency hopping | 1 bit and set to 0 or 1 |
| Resource block assignment | All bits are set to 0 or 1 |
| Remote UE index | 4 bits |
| Destination Layer 2 ID | 24 bits |

202. The relay UE receives the at least one SR, processes the at least one SR to generate at least one relay SR, and sends the at least one relay SR to a base station.

Optionally, the relay UE may send the at least one relay SR to the base station in any one of the following manner a to manner c.

Manner a: The relay UE obtains at least one physical uplink control channel resource assigned by the base station. The at least one physical uplink control channel resource is in a one-to-one correspondence with the at least one remote UE, and each uplink control channel resource is used to transmit, on an uplink, an SR of remote UE corresponding to the uplink control channel resource.

The relay UE separately processes the at least one SR to generate at least one relay SR, and sends the at least one relay SR to the base station on the at least one physical uplink control channel resource assigned by the base station. The at least one relay SR is in a one-to-one correspondence with the at least one remote UE.

Manner b: The relay UE performs combination processing on the at least one SR to generate one relay SR.

The relay UE obtains a UL grant assigned by the base station.

The relay UE sends, to the base station by using a resource indicated by the UL grant, a VIAC PDU that carries the relay SR.

After the relay UE generates the relay SR, if there is no available UL grant currently, the relay UE triggers a UL SR, and sends the UL SR to the base station to request the base station to assign the UL grant.

The MAC PDU may include a MAC header and a MAC CE. The MAC header includes a MAC subheader. The MAC CE includes the relay SR. The MAC subheader includes an LCID. The LCID included in the MAC subheader is used to indicate that the MAC CE is a relay SR MAC CE. The relay SR MAC CE includes a bitmap. The bitmap includes at least one bit that is in a one-to-one correspondence with the at least one remote UE, and each bit is used to indicate whether remote UE corresponding to the bit reports an SR. For example, if remote UE whose index value is n reports an SR, a value of a bit n in a bitmap corresponding to the remote UE is set to 0. If remote UE whose index value is n does not report an SR, a value of a bit n in a bitmap corresponding to the remote UE is set to 0. Alternatively, meanings represented by 1 and 0 are opposite. A manner of determining a bit in the bitmap may be, for example, that a leftmost bit of a first byte is 0, and bits are successively 1, 2, . . . , and 7 to the right; and a leftmost bit of a second byte is 8, and so on. A quantity of bits in the bitmap depends on a maximum quantity of remote UEs that can be connected to the relay UE, for example, may be 16 bits.

Figure 8A:
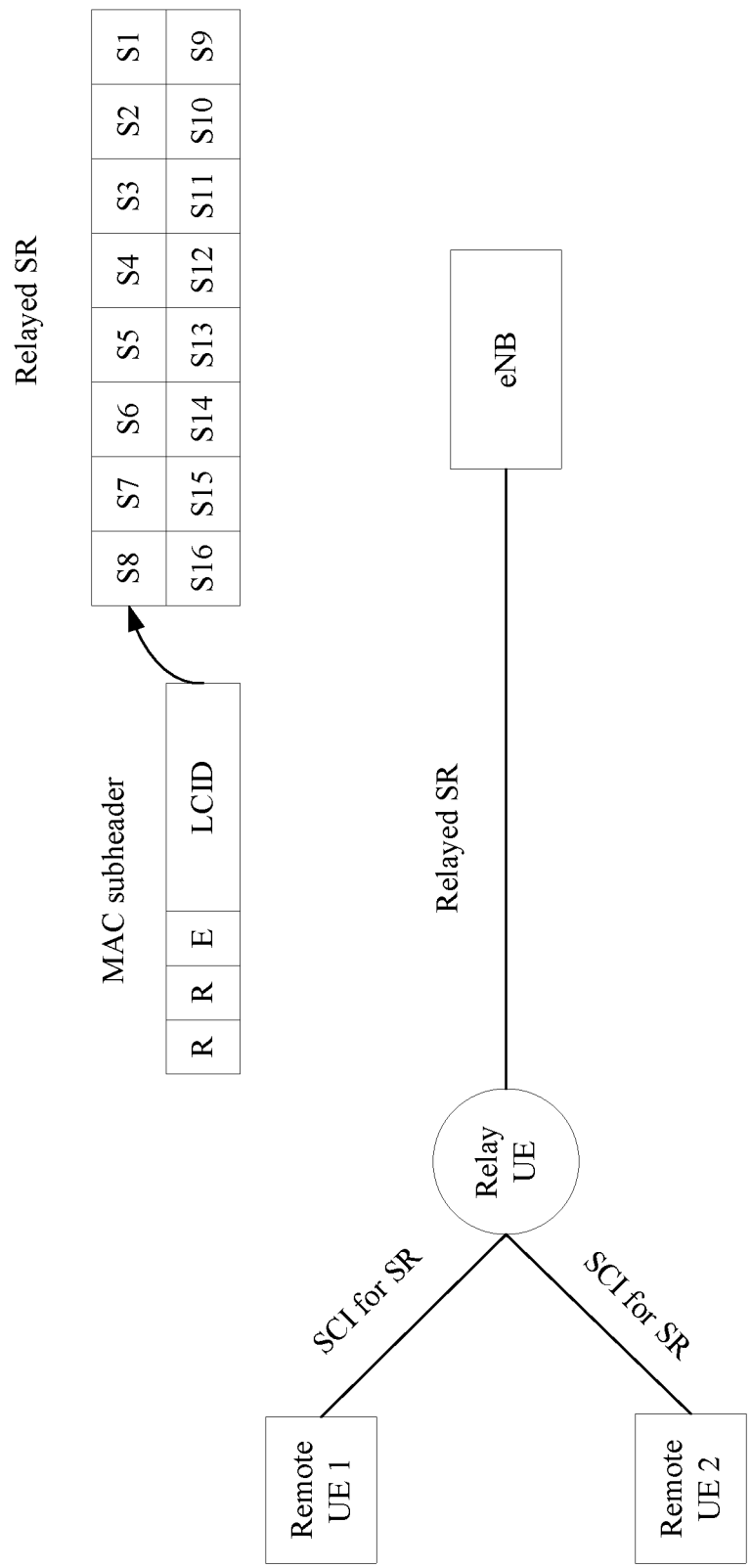
FIG. 8a is a schematic diagram of a format of a MAC PDU according to an embodiment of the present invention.

For example, as shown in FIG. 8a, if relay UE simultaneously receives an SR 1 sent by remote UE 1 and an SR 2 sent by remote UE 2, the relay UE combines the SR 1 and the SR 2 into one relay SR, and pads a MAC CE with the relay SR. In addition, the relay UE pads a MAC subheader 1 with an LCID used to indicate that the MAC CE is a MAC CE that includes the relay SR.

Optionally, to support the LCID in indicating the relay SR MAC CE, one reserved value may be selected from current reserved values of an LCID of an uplink shared channel as an LCID value for indicating the relay SR MAC CE. For example, as shown in Table 6 below, 10101 may be used to indicate a MAC CE including the relay SR. An indication function of another value of the LCID is still the same as that of the existing value, and details are not described herein again.

TABLE 6

| Index | LCID values |
| --- | --- |
| 00000 | CCCH |
| 00001-01010 | Identity of the logical channel |
| 01011 | CCCH |
| 01100-10100 | Reserved |
| 10101 | Relayed SR |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Manner c: The relay UE separately processes the at least one SR to generate at least one relay scheduling request relay SR. The at least one relay SR is in a one-to-one correspondence with the at least one remote UE.

The relay UE obtains a UL grant assigned by the base station.

The relay UE sends, to the base station based on a resource indicated by the UL grant, a MAC PDU that carries the at least one relay SR.

After the relay UE generates the relay SR, if there is no available UL grant currently, the relay UE triggers a UL SR, and sends the UL SR to the base station to request the base station to assign the UL grant.

The MAC PDU includes a MAC header. The MAC header includes at least one MAC subheader, and the at least one MAC subheader is in a one-to-one correspondence with the at least one remote UE. Each MAC subheader includes an index of remote UE corresponding to the MAC subheader and indication information used to indicate a type of a next MAC subheader adjacent to the MAC subheader.

Figure 8B:
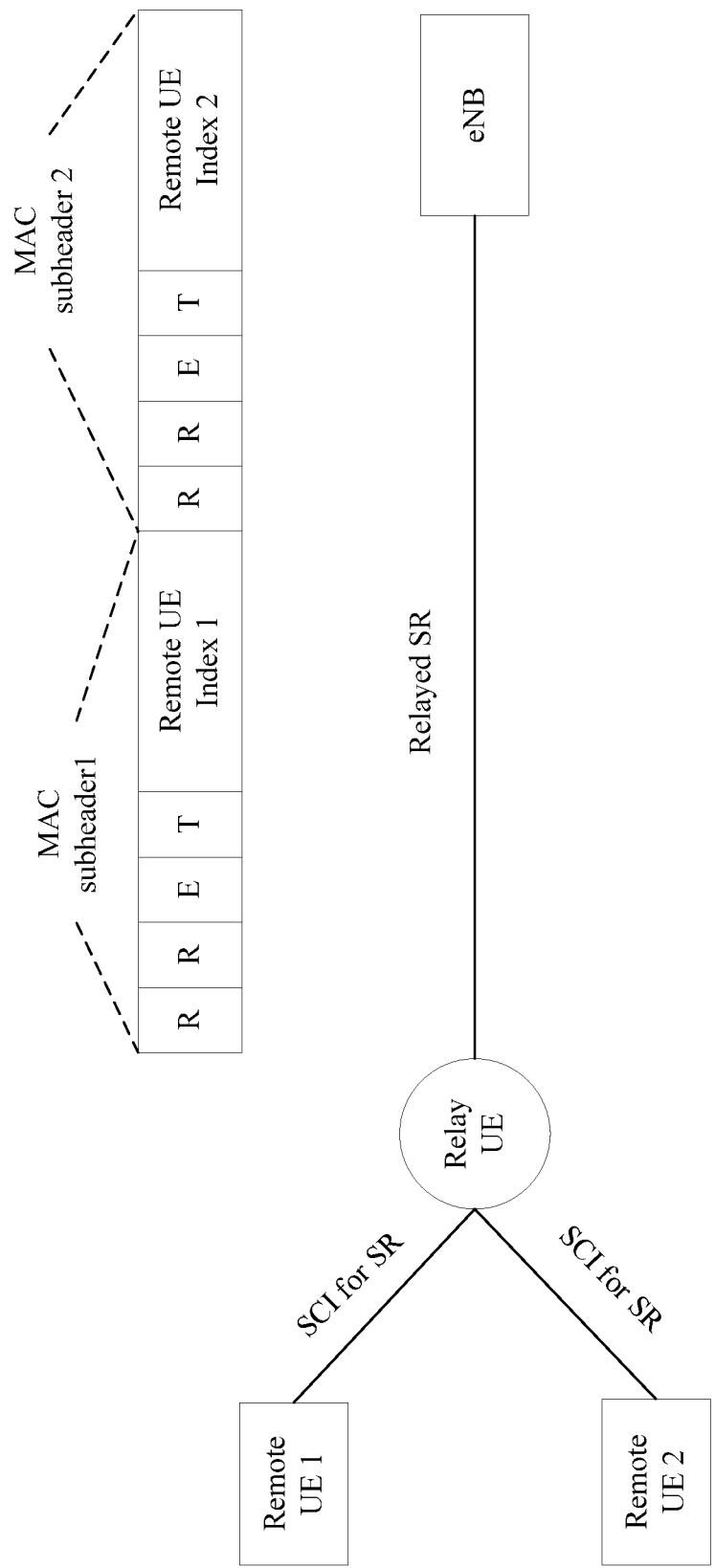
FIG. 8b is a schematic diagram of a format of a MAC PDU according to an embodiment of the present invention.

As shown in FIG. 8b, if relay UE simultaneously receives an SR 1 sent by remote UE 1 and an SR 2 sent by remote UE 2, the relay UE pads a MAC subheader 1 with an index of the remote UE 1, and pads a MAC subheader 2 with an index of the remote UE 2. In addition, in addition to a remote UE index, a MAC subheader padded with the remote UE index may further include another bit, such as a T bit and a reserved (R) bit. A value of the T bit may be used to indicate whether a next MAC subheader adjacent to the MAC subheader is a newly defined subheader that includes the remote UE index, a subheader that includes a newly defined LCID, or a subheader defined in an original system.

In addition, currently, there are two reserved bits in the MAC subheader that includes the LCID. One of the reserved bits may be used to indicate whether a next MAC subheader adjacent to the MAC subheader is a newly defined subheader that includes the remote UE index, or is similar to a subheader that includes an LCID and that is currently defined in a MAC PDU on an uplink/downlink.

203. The base station assigns an SL grant to the at least one remote UE based on the at least one relay SR.

For a process in which the base station assigns the SL grant to the at least one remote UE based on the at least one relay SR, refer to the prior art. Details are not described herein.

204. The at least one remote UE sends at least one BSR to the relay UE by using a resource indicated by the SL grant assigned by the base station.

For a manner in which any remote UE sends at least one BSR to the relay UE by using the resource indicated by the SL grant assigned by the base station, refer to the manner 1 to the manner 3 in the solution shown in FIG. 3. Details are not described herein again.

205. The relay UE receives the at least one BSR, processes the at least one BSR to generate at least one relay BSR, and sends the at least one relay BSR to the base station.

For a manner in which the relay UE sends the at least one relay BSR to the base station in step 205, refer to the manner (1) and the manner (2) in the solution shown in FIG. 3. Details are not described herein again.

Further, optionally, when the relay UE receives the UL grant and performs logical channel priority processing, the currently existing uplink BSR MAC CE (UL BSR) and sidelink BSR MAC CE (SL BSR), and the relay SR MAC CE generated after processing the received SR sent by the remote UE may be processed in the following priority orders, and specific implementation is as follows:

After obtaining the UL grant assigned by the base station, the relay UE processes the UL BSR MAC CE, the SL BSR MAC CE, and the relay SR MAC CE in any one of the following priority orders:

UL BSR MAC CE>SL BSR MAC CE=Relay SR MAC CE;

Relay SR MAC CE>UL BSR MAC CE>SL BSR MAC CE; and

UL BSR MAC CE>Relay SR MAC CE>SL BSR MAC CE.

The resource request method provided in the embodiments of the present invention is mainly described from a perspective of interaction between the remote UE, the relay UE, and the base station. It may be understood that, to implement the foregoing functions, the remote UE, the relay UE, and the base station include a corresponding hardware structure and/or a corresponding software module for performing the functions. Persons of ordinary skill in the art should be easily aware that, in combination with the examples of units and algorithms steps described in the embodiments disclosed in this specification, the present invention can be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of the present invention.

In the embodiments of the present invention, function module division may be performed on the remote UE, the relay UE, and the base station based on the foregoing method examples with reference to the accompanying drawings. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present invention is an example, and is merely logical function division. There may be another division manner in actual implementation.

Figure 9:
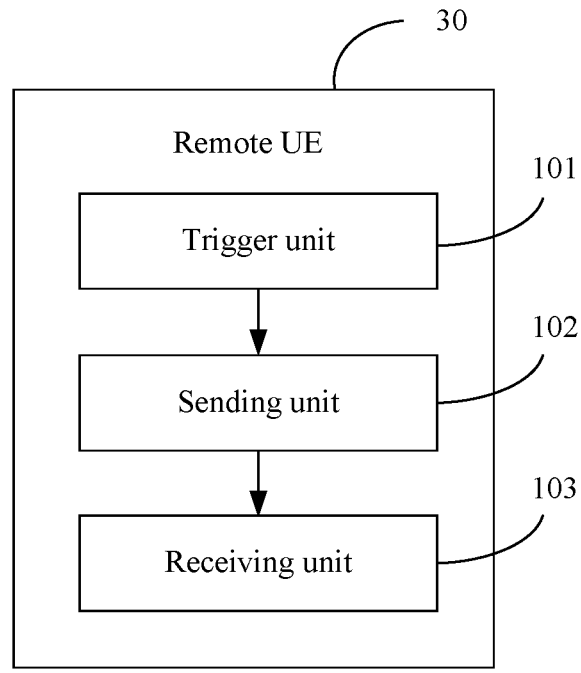
FIG. 9 is a structural diagram of remote UE according to an embodiment of the present invention.

When each function module is obtained through division by using each corresponding function, FIG. 9 is a schematic diagram of a possible structure of remote UE in an embodiment of the present invention. As shown in FIG. 9, remote UE 30 may be configured to implement the method performed by the remote UE in the method embodiment shown in FIG. 3 or FIG. 7. The remote UE 30 may include a trigger unit 101, a sending unit 102, and a receiving unit 103. For example, the trigger unit 101 is configured to support the remote UE 30 in performing an action of triggering the BSR in FIG. 3 or FIG. 7, the sending unit 102 is configured to support the remote UE 30 in performing an action of sending the BSR or the SR to the relay UE in FIG. 3 or FIG. 7, and the receiving unit 103 is configured to support the remote UE 30 in performing an action of receiving the SL grant or the UL grant configured by the base station in FIG. 3 or FIG. 7.

All related content of steps in the foregoing method embodiments may be cited in function descriptions of corresponding function modules, and details are not described herein again.

When an integrated unit is used, it should be noted that the trigger unit 101 shown in FIG. 9 may be integrated into the processor 3012 shown in FIG. 2, so that the processor 3012 performs a specific function of the trigger unit 101. The sending unit 102 and the receiving unit 103 may be integrated into the communications interface 3011 shown in FIG. 2, so that the communications interface 3011 performs specific functions of the sending unit 102 and the receiving unit 103.

Figure 10:
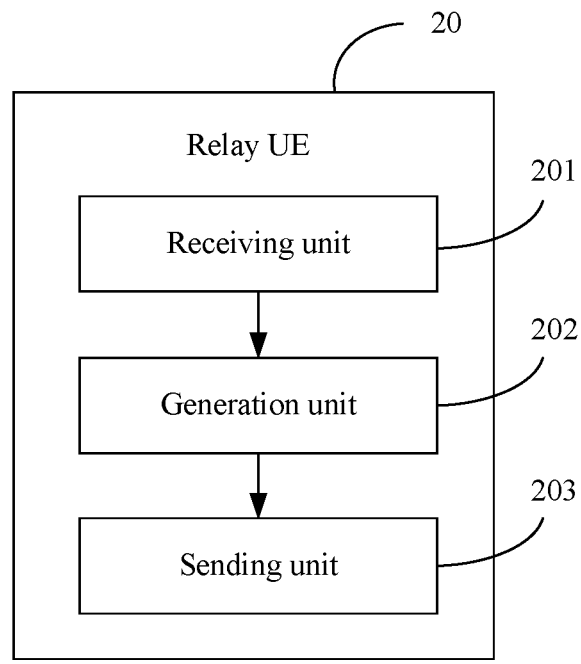
FIG. 10 is a structural diagram of relay UE according to an embodiment of the present invention.
Figure 11:
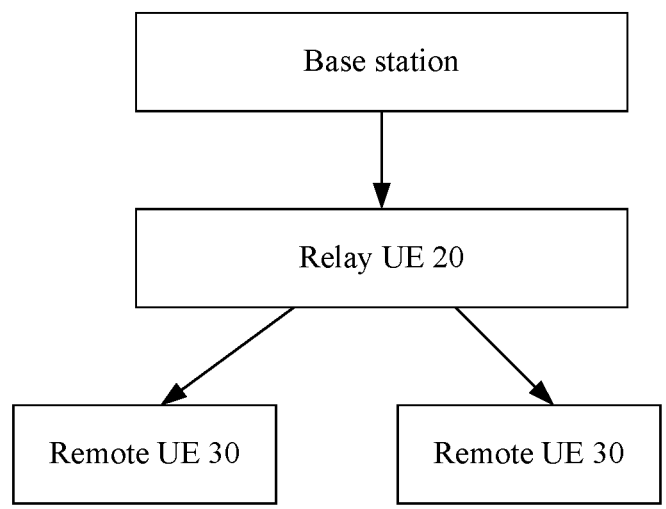
FIG. 11 is a structural diagram of a resource request system according to an embodiment of the present invention.

When each function module is obtained through division by using each corresponding function, FIG. 10 is a schematic diagram of a possible structure of relay UE in an embodiment of the present invention. As shown in FIG. 9, relay UE 20 may be configured to implement the method performed by the relay UE in the method embodiment shown in FIG. 3 or FIG. 7. The relay UE 20 may include a receiving unit 201, a generation unit 202, and a sending unit 203. For example, the receiving unit 201 is configured to support the remote UE 30 in performing an action of receiving the BSR or the SR sent by the remote UE in FIG. 3 or FIG. 7, the generation unit 202 is configured to support the relay UE 20 in performing an action of processing the BSR or the SR in FIG. 3 or FIG. 7, and the sending unit 102 is configured to support the relay UE 20 in performing an action of sending the BSR or the SR to the base station in FIG. 3 or FIG. 7.

All related content of steps in the foregoing method embodiments may be cited in function descriptions of corresponding function modules, and details are not described herein again.

When an integrated unit is used, it should be noted that the generation unit 202 shown in FIG. 10 may be integrated into the processor 2012 shown in FIG. 2, so that the processor 2012 performs a specific function of the generation unit 202. The receiving unit 201 and the sending unit 203 may be integrated into the communications interface 2011 shown in FIG. 2, so that the communications interface 2011 performs specific functions of the receiving unit 201 and the sending unit 203.

According to another aspect, an embodiment of the present invention further provides a resource request system. The resource request system may include the remote UE 30, the relay UE 20, and the base station described in any one of the foregoing embodiments.

The resource request system provided in this embodiment of the present invention implements the resource request method shown in FIG. 3 or FIG. 7, and therefore can achieve a same beneficial effect as the foregoing resource request system. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes any medium that can store program code, such as a Universal Serial Bus (USB) flash drive (USB flash drive), a removable hard disk, a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions recorded in the foregoing embodiments or make equivalent replacements to some technical features thereof, without departing from the scope of the claims.

What is claimed is:

1. Remote user equipment (remote UE), comprising:
   a communications interface;
   a processor; and
   a non-transitory computer-readable storage medium storing a program to be executed by the processor, the program including instructions for:
   triggering a buffer status report (BSR);
   obtaining a control signaling resource pool and a data resource pool that are configured by a base station for the remote UE, wherein the control signaling resource pool and the data resource pool are allocated for the remote UE to use to transmit resource request information;
   selecting a first resource from the control signaling resource pool;
   selecting a second resource from the data resource pool;
   sending, to relay user equipment (relay UE) using the first resource and the communications interface, sidelink control information (SCI), wherein the SCI comprises indication information indicating location information of the second resource; and
   sending, to the relay UE using the second resource and the communications interface, a Media Access Control protocol data unit (MAC PDU) that comprises the BSR, wherein the BSR is forwarded to the base station to inform the base station of a size of available to-be-transmitted data in a buffer of the remote UE.

2. The remote UE according to claim 1, wherein:
   the MAC PDU comprises a Media Access Control header (MAC) header and a first Media Access Control control element (MAC CE), the MAC header comprises a first Media Access Control subheader (MAC subheader), and the first MAC CE comprises the BSR; and
   the first MAC subheader comprises a logical channel ID (LCID), and the LCID indicates that the first MAC CE is a BSR MAC CE and indicates a format of the BSR MAC CE.

3. The remote UE according to claim 2, wherein the BSR MAC CE is an uplink BSR MAC CE.

4. The remote UE according to claim 3, wherein:
   when the BSR MAC CE is the uplink BSR MAC CE, the format of the BSR MAC CE is a long BSR MAC CE, a short BSR MAC CE, or a truncated BSR MAC CE.

5. The remote UE according to claim 1, wherein:
   the MAC PDU comprises a Media Access Control header (MAC) header, a second Media Access Control control element (MAC CE), and a first Media Access Control service data unit, the MAC header comprises a first MAC subheader, and the second MAC CE is a MAC CE that comprises the BSR; and
   the second MAC header comprises a logical channel ID (LCID), and the LCID comprised in the second MAC header indicates that the second MAC CE is a BSR MAC CE and indicates a format of the BSR MAC CE.

6. Relay user equipment (relay UE), comprising:
   a communications interface, configured to receive a plurality of buffer status reports (BSRs) reported by a plurality of remote user equipment (remote UE), wherein the plurality of BSRs sent by the plurality of remote UE each indicate a size of available to-be-transmitted data in a buffer of the respective remote UE that sent the respective BSR;
   a processor; and
   a non-transitory computer-readable storage medium storing a program to be executed by the processor, the program including instructions for:
   Performing combination processing on the plurality of BSRs to generate one relay BSR;
   wherein the communications interface is further configured to:
   obtain an uplink scheduling grant (UL grant) assigned by a base station, and send, to the base station using a resource indicated by the UL grant, a Media Access Control protocol data unit (MAC PDU) that carries the relay BSR, wherein the MAC PDU comprises a Media Access Control header (MAC header) and a first Media Access Control element (MAC CE), the MAC header comprises a first media access control (MAC) subheader, and the first MAC CE comprises the relay BSR;
   wherein the first MAC subheader comprises logical channel ID (LCID), and the LCID indicates that the first MAC CE is a relay BSR MAC CE;
   wherein the relay BSR MAC CE comprises a group of BSR information that is in a one-to-one correspondence with a remote UE corresponding to the group of BSR information; and
   wherein the group of BSR information comprises: an index of the remote UE corresponding to the group of BSR information, a format of the BSR reported by the remote UE corresponding to the group of BSR information, a logical channel group quantity comprised in the BSR reported by the remote UE corresponding to the group of BSR information, a logical channel group identification comprised in the BSR reported by the remote UE corresponding to the group of BSR information, or a size of available to-be-transmitted data on each logical channel in the BSR reported by the remote UE corresponding to the group of BSR information.

7. The relay UE according to claim 6, wherein the program further includes instructions for:
   when the relay UE has no available UL grant, trigger a scheduling request (SR); and
   wherein the communications interface is configured to:
   send the SR to the base station, wherein the SR requests the base station to assign the UL grant.

8. The relay UE according to claim 6, wherein the program further includes instructions for:
   after obtaining the UL grant assigned by the base station, process an uplink buffer status report MAC CE (UL BSR MAC CE), a sidelink buffer status report (sidelink BSR) MAC CE (SL BSR MAC CE), and a relay BSR MAC CE in any of the following priority orders when performing logical channel processing:

UL BSR MAC CE>SL BSR MAC CE=Relay BSR MAC CE;

UL BSR MAC CE=Relay BSR MAC CE>SL BSR MAC CE;

UL BSR MAC CE>SL BSR MAC CE>Relay BSR MAC CE; and

UL BSR MAC CE>Relay BSR MAC CE>SL BSR MAC CE.

9. Relay user equipment (relay UE), comprising:
a communications interface, configured to receive a plurality of buffer status reports (BSRs) reported by a plurality of remote user equipment (remote UE), wherein each BSR of the plurality of BSRs sent by the plurality of remote UE indicates a size of available to-be-transmitted data in a buffer of a respective remote UE;
a processor; and
a non-transitory computer-readable storage medium storing a program to be executed by the processor, the program including instructions for:
separately processing the plurality of BSRs to generate a plurality of relay BSRs, wherein each relay BSR of the plurality of relay BSRs is in a one-to-one correspondence with the respective remote UE from which the respective relay BSR is received; and
wherein the communications interface is further configured to:
obtain an uplink scheduling grant (UL grant) assigned by a base station, and send, to the base station using a resource indicated by the UL grant, a Media Access Control protocol data unit (MAC PDU) that carries the plurality of relay BSRs;
wherein the MAC PDU comprises a media access control (MAC) header and a first Media Access Control control element (MAC CE), the MAC header comprises a first MAC subheader, the first MAC subheader is in a one-to-one correspondence with the first MAC CE, the first MAC CE is a relay BSR MAC CE, and the first MAC CE is in a one-to-one correspondence with a relay BSR of a remote UE corresponding to the first MAC CE;
wherein the first MAC subheader comprises a logical channel ID (LCID), and the LCID indicates that the first MAC CE corresponding to the first MAC subheader is the relay BSR MAC CE and indicates a format of the relay BSR MAC CE; and
wherein the first MAC CE comprises: an index of the remote UE corresponding to the first MAC CE, a logical channel group identificatio comprised in the BSR reported by the remote UE corresponding to the first MAC CE, or a size of available to-be-transmitted data on each logical channel in the BSR reported by the remote UE corresponding to the first MAC CE.

10. The remote UE according to claim 2, wherein the BSR MAC CE is a sidelink BSR MAC CE.

11. The remote UE according to claim 10, wherein:
when the BSR MAC CE is the sidelink BSR MAC CE, a format of the BSR MAC CE is a sidelink buffer status report (sidelink BSR) MAC CE or a truncated sidelink buffer status report (truncated sidelink BSR) MAC CE.

* * * * *

UNITED STATES PATENT AND TRADEMARK OFFICE
CERTIFICATE OF CORRECTION

PATENT NO. : 10,869,329 B2
APPLICATION NO. : 16/338112
DATED : December 15, 2020
INVENTOR(S) : Xu et al.

Page 1 of 1

It is certified that error appears in the above-identified patent and that said Letters Patent is hereby corrected as shown below:

In the Claims

In Column 32, Line 24, Claim 6, delete "Performing" and insert --performing--.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*